(12) United States Patent
Watanabe et al.

(10) Patent No.: US 10,603,829 B2
(45) Date of Patent: Mar. 31, 2020

(54) APPARATUS FOR TAKING OUT MOLDED PRODUCT

(71) Applicant: Yushin Precision Equipment Co., Ltd., Kyoto (JP)

(72) Inventors: Fumitake Watanabe, Kyoto (JP); Atsushi Shirasaki, Kyoto (JP); Takayo Kotani, Kyoto (JP)

(73) Assignee: YUSHIN PRECISION EQUIPMENT CO., LTD., Kyoto (JP)

( * ) Notice: Subject to any disclaimer, the term of this patent is extended or adjusted under 35 U.S.C. 154(b) by 476 days.

(21) Appl. No.: 15/370,026

(22) Filed: Dec. 6, 2016

(65) Prior Publication Data

US 2017/0165888 A1    Jun. 15, 2017

(30) Foreign Application Priority Data

Dec. 9, 2015   (JP) ................................ 2015-240363
Dec. 1, 2016   (JP) ................................ 2016-234115

(51) Int. Cl.
*B29C 45/76*      (2006.01)
*B25J 9/16*       (2006.01)
(Continued)

(52) U.S. Cl.
CPC ............ *B29C 45/7626* (2013.01); *B25J 9/16* (2013.01); *B29C 45/4225* (2013.01); *F16F 7/1011* (2013.01); *B25J 13/087* (2013.01); *B25J 13/088* (2013.01); *B29C 33/442* (2013.01); *B29C 45/40* (2013.01); *B29C 45/42* (2013.01); *B29C 2045/1792* (2013.01); *B29C 2045/1793* (2013.01); *B29C 2045/4073* (2013.01);
(Continued)

(58) Field of Classification Search
CPC .... B29C 2045/1792; B29C 2045/1793; B29C 2045/4073; B29C 2045/4266; B29C 2045/7633; B29C 45/40; B29C 45/42; B29C 45/4225; B29C 45/7626; B29C 33/442; B25J 13/087; B25J 13/088
USPC .......................................................... 425/139
See application file for complete search history.

(56) References Cited

U.S. PATENT DOCUMENTS

| | | | | |
|---|---|---|---|---|
| 5,354,194 A | * | 10/1994 | Kresak .................... | B29C 45/42 264/335 |
| 2012/0217108 A1 | * | 8/2012 | Muragishi ............. | F16F 7/1005 188/379 |
| 2013/0004613 A1 | * | 1/2013 | Hashimoto ............. | B29C 33/44 425/443 |

FOREIGN PATENT DOCUMENTS

| | | | | |
|---|---|---|---|---|
| EP | 1063072 A1 | * | 12/2000 | ......... B29C 45/7626 |
| EP | 2072852 | | 6/2009 | |

(Continued)

OTHER PUBLICATIONS

Takashi et al., JP 2004-223798 machine translation, Aug. 12, 2004 (Year: 2004).*
Irish Search Report dated Oct. 24, 2017, 2 pages.

*Primary Examiner* — Joseph S Del Sole
*Assistant Examiner* — Lawrence D. Hohenbrink, Jr.
(74) *Attorney, Agent, or Firm* — Rankin, Hill & Clark LLP

(57) ABSTRACT

An apparatus for taking out a molded product is provided, the apparatus being capable of suppressing displacement vibration of an attachment mounted at a leading end of each of one or more approach frames by active control using one or more electromagnetic actuators. The apparatus includes an active vibration suppressing system. One or more elec- (Continued)

tromagnetic actuators are mounted to the attachment of each approach frame or each approach frame.

21 Claims, 23 Drawing Sheets

(51) Int. Cl.
| | | |
|---|---|---|
| *F16F 7/10* | (2006.01) | |
| *B29C 45/42* | (2006.01) | |
| B29C 45/40 | (2006.01) | |
| B29C 33/44 | (2006.01) | |
| B29C 45/17 | (2006.01) | |
| B25J 13/08 | (2006.01) | |

(52) U.S. Cl.
CPC ............... *B29C 2045/4266* (2013.01); *B29C 2045/7633* (2013.01)

(56) References Cited

FOREIGN PATENT DOCUMENTS

| | | | | |
|---|---|---|---|---|
| EP | 2520826 | | | 11/2012 |
| JP | 2004-218818 | | | 8/2004 |
| JP | 2004-223798 | | | 8/2004 |
| JP | 2004223798 | A | * | 8/2004 |
| JP | 2010-111012 | | | 5/2010 |
| WO | 2007/129627 | | | 11/2007 |
| WO | 2011/081018 | | | 7/2011 |

\* cited by examiner

actuators, and is configured to perform active control to suppress a displacement vibration of the attachment mounted on each of the one of more approach frames by causing the one or more actuators to apply to the attachment a vibration having an antiphase to the displacement vibration of the attachment. The term "attachment" used herein refers to various types of attached parts mounted on the approach frames. The attachment includes a pickup head, a posture controller including a reverse section to which the pickup head is mounted, a chuck device, a cutter device, and so forth. In the present invention, the one or more actuators are one or more electromagnetic actuators. The one or more electromagnetic actuators are mounted to the attachment mounted on each of the one of more approach frames or each of the one or more approach frames such that the one or more electromagnetic actuators do not collide with one or more molding dies disposed inside a molding machine. The magnitude of vibration can be set as desired in the electromagnetic actuators, compared to the dynamic vibration absorbing device. Thus, the active control can be applied to the apparatus for taking out a molded product with high versatility.

APPARATUS FOR TAKING OUT MOLDED PRODUCT

TECHNICAL FIELD

The present invention relates to an apparatus for taking out a molded product that is capable of suppressing a displacement vibration of an attachment mounted on an approach frame in a short time.

BACKGROUND ART

JP 2010-111012 A discloses an apparatus for taking out a molded product. The apparatus includes a pickup head (attachment) driven by a drive source to take out a molded product from a molding device, a table to which a vibration component of the pickup head is input, and control means for controlling the moving speed of the pickup head to suppress a displacement vibration of the pickup head by driving a servo motor (drive source) by feedforward control using the table, thereby suppressing the vibration of the pickup head.

JP 2004-223798 A discloses a vibration suppressing system for an apparatus for taking out a molded product. The apparatus is operable to control the movement of a chuck (attachment) for holding a molded product between predetermined positions to take out the molded product from a resin molding device. At least one of the chuck and a mover for moving the chuck is provided with a dynamic vibration absorbing device operable to generate vibration for negating the residual vibration of the mover when the movement of the chuck is stopped. The dynamic vibration absorbing device allows the vibration of a fluid sealed in a container such that the fluid can flow therein, and vibrates the fluid and converges the vibration at an attenuation rate according to the viscosity of the fluid.

SUMMARY OF INVENTION

Technical Problem

With the related art according to JP 2010-111012 A, however, it takes time to suppress the vibration. In addition, it is difficult to set conditions for suppressing the vibration.

With the related art according to JP 2004-223798 A, it is necessary to separately prepare a dynamic vibration absorbing device that utilizes the viscosity of the fluid and generates an appropriate resonant vibration according to changes in pickup conditions. Thus, the dynamic vibration absorbing device lacks versatility.

It is an object of the present invention to provide an apparatus for taking out a molded product that is capable of suppressing a displacement vibration of an attachment mounted at a leading end of each of one or more approach frames by active control using one or more electromagnetic actuators.

Solution to Problem

The present invention is directed to an apparatus for taking out a molded product, including a positioning servomechanism, one or more approach frames, and an active vibration suppressing system. The positioning servomechanism uses a motor. The one or more approach frames are controlled by the positioning servomechanism, and each have an attachment mounted at a leading end thereof. The active vibration suppressing system includes one or more The one or more approach frames include a first approach frame having an attachment mounted at a leading end thereof and configured to pick up a molded product from the molding die or to be attached with an insert component to be inserted into the molding die, and a second approach frame having an attachment mounted at a leading end thereof and configured to remove a waste part from the molded product picked up from the molding die by the first approach frame. It is not necessary that the one or more approach frames should be inserted in the vertical direction, and the one or more approach frames may also be inserted in an oblique direction or the horizontal direction.

Defining that a Z direction denotes a direction in which one of the one or more approach frames moves into the molding die, a Y direction denotes a direction orthogonal to the Z direction, in which the attachment mounted on the one of the one or more approach frames approaches to or retracts from the molded product within the molding die, and an X direction denotes a direction orthogonal to the Y and Z directions, the one or more electromagnetic actuators include a first electromagnetic actuator operable to suppress at least the displacement vibration of the attachment as caused in the Y direction. This is because, in the apparatus for taking out a molded product, the vibration of the attachment as caused in the Y direction significantly affects the pickup of the molded product and insertion of the insert component.

The one or more electromagnetic actuators may include a first electromagnetic actuator operable to suppress the displacement vibration of the attachment as caused in the Y direction and a second electromagnetic actuator operable to suppress the displacement vibration of the attachment as caused in the X direction. In particular, the displacement vibration of the attachment as caused in the X direction significantly affects the positioning accuracy in releasing the molded product at a releasing position and inserting the insert component.

The one or more electromagnetic actuators may include a first electromagnetic actuator operable to suppress the displacement vibration of the attachment as caused in the Y direction, a second electromagnetic actuator operable to suppress the displacement vibration of the attachment as caused in the X direction, and a third electromagnetic actuator operable to suppress the displacement vibration of the attachment as caused in the Z direction. The active control can be performed at all times if the first to third electromagnetic actuators are provided.

If the attachment mounted on one of the one or more approach frames includes a posture controller configured to control a posture of a pickup head, the one or more electromagnetic actuators are preferably mounted on the posture controller. While the posture controller has a built-in mechanism operable to control the posture of the pickup head, it is easy to secure a mounting space for the electromagnetic actuators in the posture controller and the posture controller efficiently transfers the vibration to the pickup head. The posture controller is replaced much less frequently than the pickup head, which significantly reduces the cost to implement the active control. Thus, the posture controller preferably includes a container portion to receive the one or more electromagnetic actuators. The presence of the container portion can prevent unwanted interference of the electromagnetic actuators with surrounding parts.

If the attachment mounted on one of the one or more approach frames includes a posture controller provided with a pickup head, the one or more electromagnetic actuators may be mounted on the pickup head. If the electromagnetic actuators are mounted on the pickup head, the vibration can be suppressed most efficiently.

Alternatively, the one or more electromagnetic actuators may be mounted relative to the housing of the posture controller such that the one or more electromagnetic actuators are positioned outside a bottom surface of the housing of the posture controller when the molded product is picked up from the molding die. This allows the electromagnetic actuators to be mounted to the housing of the existing posture controller.

If the attachment mounted on one of the one or more approach frames is constituted from a posture controller having a pickup head mounted thereon, a pickup head fixture is preferably attached to an outer side of a housing of the posture controller so as to be rotatable between a first position and a second position. Preferably, the pickup head extends along the approach frame and the one or more electromagnetic actuators are positioned below the posture controller when the pickup head fixture is situated in the first position, and the pickup head extends in a direction orthogonal to an extending direction of the approach frame and the one or more electromagnetic actuators are positioned by the side of the posture controller when the pickup head fixture is situated in the second position. With the use of the pickup head fixture, when the pickup head is situated between the molding dies, the electromagnetic actuators are positioned below the posture controller, and therefore do not collide with the molding dies. When the pickup head is situated outside the molding dies and in the second position, the pickup head is in a posture for releasing the molded product. Also at this time, the displacement vibration of the pickup head can be suppressed by causing the electromagnetic actuators to operate.

The one electromagnetic actuator may be mounted onto an outer periphery of the leading end of each of the one or more approach frames so as to be positioned in proximity to the attachment. The leading end of the approach frame usually does not get into a space between the molding dies. Thus, if the one or more electromagnetic actuators are disposed on the outer periphery of the leading end of each approach frame, the vibration for suppressing the displacement vibration can be efficiently applied to the attachment which is located in proximity to the one or more electromagnetic actuators.

The active vibration suppressing system preferably performs active control for a period from the time before one of the one or more approach frames uses the attachment to pick up the molded product from the molding die or to place an insert component in the molding die until the molded product is released in a releasing position. This not only increases the speed of pickup of the molded product and insertion of the insert component, but also effectively prevents the molded product from being deformed by the vibration applied before the molded product is cured.

The motor for the positioning servomechanism operable to move the one or more approach frames may be constituted from an AC servomotor, and a transport mechanism of belt-type, rope-type, or carriage-type may be provided between the AC servomotor and each approach frame.

The active vibration suppressing system further includes a displacement vibration detecting section, an additional vibration detecting section, and a drive signal generating section. The displacement vibration detecting section is operable to output a displacement vibration detection signal (a signal indicative of a detected displacement vibration) proportional to a displacement vibration of the attachment. The additional vibration detecting section is operable to output an additional vibration detection signal (a signal indicative of a detected additional vibration) proportional to an additional vibration generated by the one or more electromagnetic actuators. The drive signal generating section is operable to generate a drive signal required for active control of the one or more electromagnetic actuators so as to suppress the displacement vibration of the attachment mounted on each of the one or more approach frames, based on the displacement vibration detection signal and the additional vibration detection signal. In the present invention, the displacement vibration detecting section is capable of outputting the displacement vibration detection signal without using a sensor to be inserted into the molding die. In the present invention, the output from the displacement vibration detecting section is not affected by the temperature of an atmosphere between the molding dies, and thus the active control can be reliably executed. In addition, it is not necessary to insert a sensor into the molding die, and thus the sensor and the molding die do not collide with each other.

The displacement vibration detecting section, which does not use a sensor to be disposed in the molding die, may be configured to output, as the displacement vibration detection signal, a motor current signal of the motor used in the positioning servomechanism operable to move the one or more approach frames, or a torque signal of the motor, or a signal proportional to the motor current signal or the torque signal. In the active control, it is necessary to detect the displacement vibration as a displacement vibration detection signal including information on a displacement vibration frequency component proportional to displacement vibration of the attachment. The inventors have found that a motor current signal of the motor used in the positioning servomechanism operable to move the one or more approach frames, or a torque signal of the motor, or a signal proportional to the motor current signal or the torque signal includes information on a displacement vibration frequency component proportional to the displacement vibration of the attachment. From this finding, it is found that the displacement vibration detecting section may be configured to output, as the displacement vibration detection signal proportional to the displacement vibration of the attachment, a motor current signal of the motor used in the positioning servomechanism operable to move the one or more approach frames, or a torque signal of the motor, or a signal proportional to the motor current signal or the torque signal. If the displacement vibration detecting section detects a motor current signal of the motor used in the positioning servomechanism operable to move the one or more approach frames, or a torque signal of the motor, or a signal proportional to the motor current signal or the torque signal and obtains, from such a signal, information on a displacement vibration frequency component proportional to the displacement vibration of the attachment as caused in the X direction or the Y direction, it is no longer necessary to provide a sensor around the attachment or the molding die in order to detect a displacement vibration of the attachment. The motor current signal of the motor and the torque signal can be measured at all times. Therefore, according to the present invention, the active control can be performed even when the apparatus operates outside the molding die.

The displacement vibration detecting section may be configured to output, as the displacement vibration detection signal, a displacement feedback signal of the motor used in the positioning servomechanism operable to move the one or more approach frames, or a signal proportional to the displacement feedback signal. This is based on the finding from the study by the inventors that the displacement feedback signal also includes a component varied in proportion to the displacement vibration.

If the electromagnetic actuators are inserted into the molding die, or disposed so as to be proximate to the molding die, an additional vibration detection signal proportional to additional vibration generated by the electromagnetic actuators is preferably outputted without using a sensor to achieve a sensorless configuration. Specifically, the additional vibration detecting section may be operable to detect a counter electromotive force caused when an electric power proportional to the drive signal is supplied to the one or more electromagnetic actuators and to output a signal proportional to the detected counter electromotive force as the additional vibration detection signal. Further, the counter electromotive force can be calculated from a voltage applied to a resistor connected in series with an excitation coil, a voltage across both ends of the excitation coil, and an excitation voltage of the excitation coil. The resistor is hardly affected by variations in temperature, which contributes to achieving a sensorless configuration.

If the electromagnetic actuators are disposed outside the molding die, the additional vibration detecting section may be constituted from an acceleration sensor attached to a mover of each of the one or more electromagnetic actuators and operable to detect an acceleration of the mover. Besides the acceleration sensor, a strain gauge can also be used as the sensor.

The term "displacement vibration" used herein means vibration of the attachment displacement. The displacement vibration includes a plurality of vibration frequency components based on first-order vibration, second-order vibration, and so forth caused by operation of the one or more approach frames and the attachments. Thus, the active vibration suppressing system may further include a phase shift correcting section operable to correct a phase shift of the displacement vibration detection signal outputted from the displacement vibration detecting section, based on predetermined phase shift information, and to generate a corrected displacement vibration detection signal. In this case, the drive signal generating section is preferably configured to generate the drive signal so as to suppress the displacement vibration of the one or more electromagnetic actuators, based on a displacement vibration frequency component included in the corrected displacement vibration detection signal and having a phase shift corrected and an additional vibration frequency component included in the additional vibration detection signal. A phase shift due to various factors such as the configuration of the displacement vibration detecting section is caused between the displacement vibration detection signal and the actual displacement vibration. Once setting is completed for the apparatus for taking out a molded product, the shapes and the weights of the pickup head and the molded product to be taken out will not be varied. Thus, the phase shift can be calculated in advance by prior measurement performed before pickup operation is started. Thus, it is preferable to correct a phase shift of the displacement vibration detection signal based on predetermined phase shift information, to generate a corrected displacement vibration detection signal, and to suppress oscillation based on the phase shift. In many cases, the electromagnetic actuators are mounted on the approach frame or the attachment in order to suppress vibration of the pickup head. The additional vibration detecting section detects additional vibration as caused in the horizontal direction or the vertical direction generated by the actuators, and outputs an additional vibration detection signal including information on an additional vibration frequency component of the additional vibration. If the actuators are caused to operate based on the corrected displacement vibration detection signal to perform vibration suppressing operation, the active control is performed with the additional vibration frequency component of the actuators in the horizontal direction included in the displacement vibration frequency component. If the active control using the actuators is performed with the additional vibration frequency component included in the displacement vibration frequency component, however, it may take time to suppress the displacement vibration, or the vibration suppressing operation may cause oscillation. Thus, the drive signal generating section generates a drive signal required to suppress the vibration of the pickup head as caused in the horizontal direction or the vertical direction so as not to be affected by the additional vibration frequency component, based on the displacement vibration frequency component included in the corrected displacement vibration detection signal and the additional vibration frequency component included in the additional vibration detection signal. As discussed earlier, since additional vibration (additional vibration frequency component) generated due to the vibration of the electromagnetic actuators is included in the displacement vibration frequency component, the vibration cannot be suppressed only with a drive signal generated based only on a detection signal including information on the displacement vibration frequency component. Thus, the drive signal generating section can generate a drive signal, which is not affected by the additional vibration frequency component, by using information on the additional vibration frequency component due to additional vibration of a vibrator for each of the electromagnetic actuators operable to generate vibration for suppressing the vibration of the pickup head as caused in the horizontal direction or the vertical direction, in addition to a detection signal including information on the displacement vibration frequency component.

Specifically, the drive signal generating section is configured to adjust a gain of the corrected displacement vibration detection signal and a gain of the additional vibration detection signal, and then to perform computation to reduce or remove an effect due to the additional vibration frequency component generated by the additional vibration of the one or more electromagnetic actuators and included in the displacement vibration frequency component. Gain adjustment enables computation by adjusting the difference in dimension and amplitude between the corrected displacement vibration detection signal and the additional vibration detection signal.

According to the consideration by the inventors, the additional vibration frequency component detected by the additional vibration detecting section is preferably a frequency component of a velocity of the additional vibration. This is to prevent oscillation by increasing attenuation of the additional vibration.

A displacement sensor may be disposed by the side of the releasing position so as to be operable to detect lateral displacement vibration as the attachment mounted on one of the one or more approach frames moves toward a releasing position where the molded product is released from the attachment, oscillating in the X direction. In this case, the active vibration suppressing system is preferably configured to perform active control in which the second electromagnetic actuator is used to suppress the lateral displacement vibration, based on an output from the displacement sensor.

DESCRIPTION OF EMBODIMENTS

An apparatus for taking out a molded product according to embodiments of the present invention will be described in detail below with reference to the accompanying drawings.

First Embodiment

<Configuration of Apparatus for Taking Out Molded Product>

Figure 1:
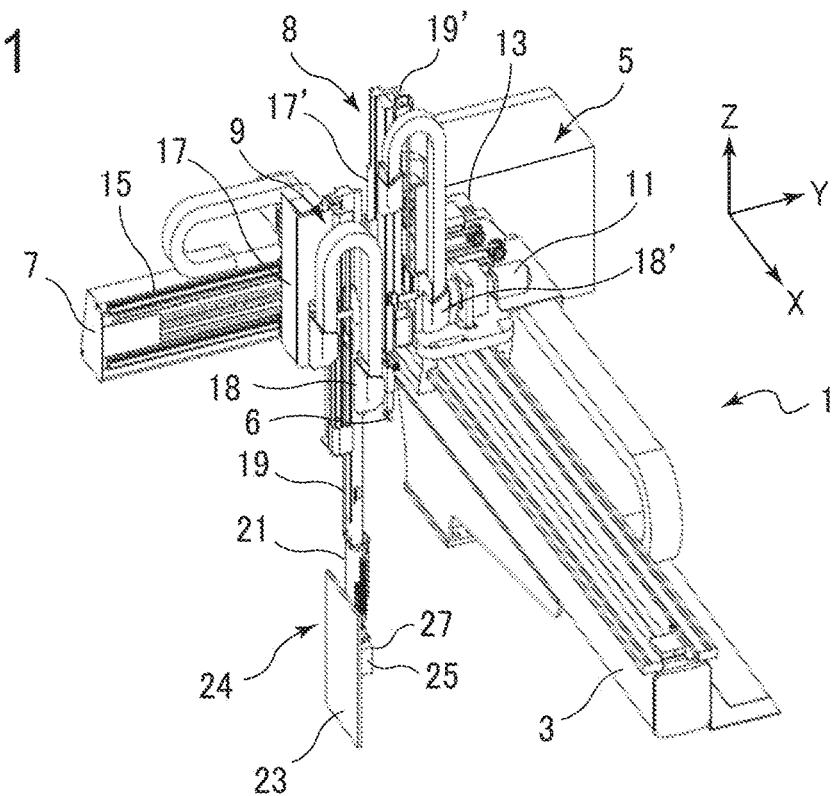
FIG. 1 illustrates the overall configuration of an apparatus for taking out a molded product according to an embodiment of the present invention.

FIG. 1 illustrates the overall configuration of an apparatus 1 for taking out a molded product according to an embodiment of the present invention. The apparatus 1 is a traverse-type apparatus for taking out a molded product. Abase portion of the apparatus 1 is supported by a fixing platen of a molding machine (not illustrated). The apparatus 1 illustrated in FIG. 1 includes a lateral frame 3, a first travelling body 5, an extraction frame 7, a runner approach unit 8, and a molded product-suctioning approach unit 9. The lateral frame 3 has a cantilever beam structure in which the lateral frame 3 extends in the X-frame direction which is horizontal and orthogonal to a longitudinal direction of the molding machine (not illustrated). The first travelling body 5 is supported by the lateral frame 3, and advanced and retracted in the X-frame direction along the lateral frame 3 as driven by a drive source which is an AC servomotor 11 included in a servomechanism. The extraction frame 7 is disposed at the first travelling body 5, and extends in the Y-frame direction which is parallel to the longitudinal direction of the molding machine. The runner approach unit 8 and the molded product-suctioning approach unit 9 are supported by the extraction frame 7 to be movable in the Y direction as driven by a drive source which is an AC servo motor 13 included in the servomechanism.

The runner approach unit 8 includes an approach frame 19' operable to get into a travelling body 17' in the Z direction. The travelling body 17' is movably supported by the extraction frame 7. The transfer body 17' is movable in the Y direction when a belt 15 is rotationally driven by the AC servo motor 13. The approach frame 19' is advanced in the vertical direction (Z direction) by a drive source 18'. The approach frame 19' includes a chuck 6 serving as an attachment for holding a runner to be wasted.

A travelling body 17 which is included in the molded product-suctioning approach unit 9 is moved in the Y direction on the extraction frame 7 when the belt 15 is rotationally driven by the AC servomotor 13. The molded product-suctioning approach unit 9 includes an approach frame 19, a reverse unit 21, and a pickup head 23. The approach frame 19 is also called "elevation frame", and is advanced in the vertical direction (Z direction) as driven by a drive source 18. The reverse unit 21 serves as a posture controller to be rotated about a frame line of the approach frame 19. The pickup head 23 is disposed at the reverse unit 21. In the present embodiment, the reverse unit 21 and the pickup head 23 constitute an attachment 24. If the reverse unit 21 is not provided, the pickup head 23 constitutes the attachment 24. In the embodiment, an electromagnetic actuator 25 is mounted on the reverse unit 21 of the attachment 24. An acceleration sensor 27 is attached to a mover of the electromagnetic actuator 25. In theory, the mounting position of the electromagnetic actuator 25 is not limited to the attachment 24. It is a matter of course that the electromagnetic actuator 25 may be mounted on the approach frame 19.

<Configuration of Active Vibration Suppressing System>

Figure 2:
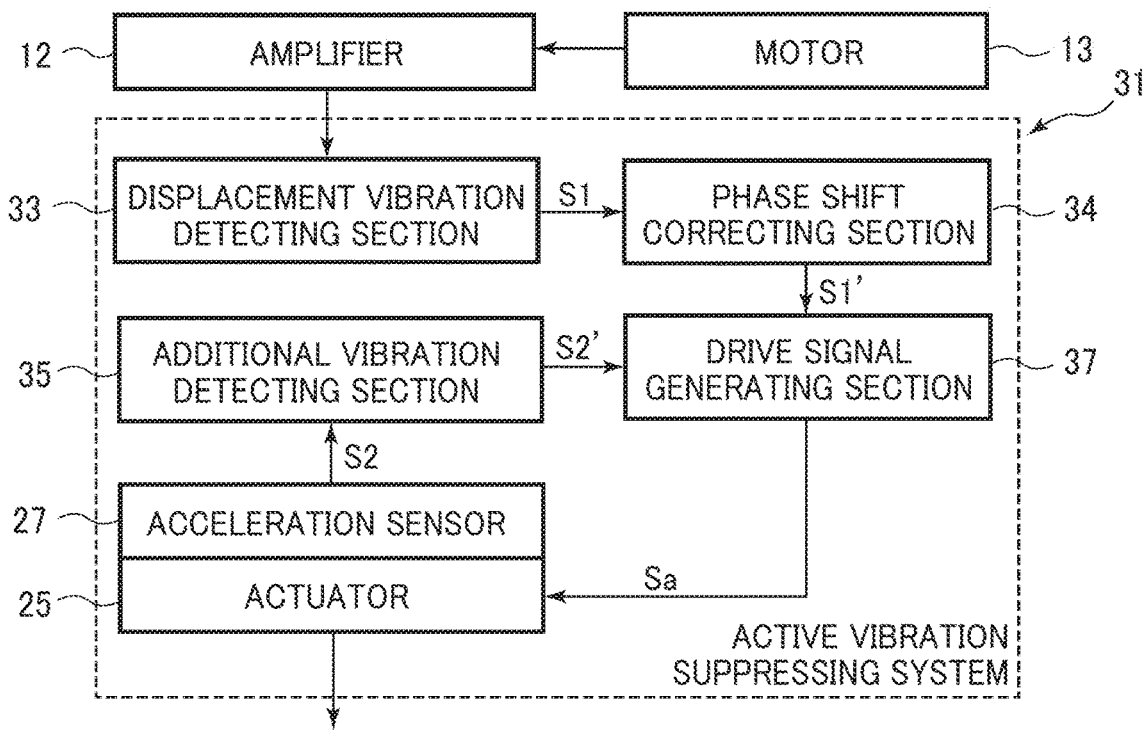
FIG. 2 is a block diagram illustrating the configuration of a control section.

The apparatus 1 according to the present embodiment includes an active vibration suppressing system 31 illustrated in FIG. 2 and provided at the control section not illustrated in FIG. 1. The active vibration suppressing system 31 includes a displacement vibration detecting section 33, a phase shift correcting section 34, the electromagnetic actuator 25, an additional vibration detecting section 35, and a drive signal generating section 37. The electromagnetic actuator 25 is mounted on the reverse unit 21 to suppress the vibration of the attachment 24 as caused in the horizontal direction. The electromagnetic actuator 25 is operable to apply a vibration to the attachment 24. In particular, the electromagnetic actuator is operable to generate vibration with desired power and at a desired frequency. In the embodiment, an electromagnetic actuator manufactured by Sinfonia Technology Co., Ltd. (product number: RM040-021) is used. In the embodiment, the attachment 24 is constituted from the reverse unit 21 mounted on the approach frame 19 and the pickup head 23 mounted on the reverse unit 21. Therefore, as discussed earlier, the electromagnetic actuator 25 is mounted to the reverse unit 21. This is because the reverse unit 21 has predetermined rigidity, and therefore can effectively suppress the vibration. In order to suppress the vibration as caused in the horizontal direction (Y direction or X direction), the electromagnetic actuator 25 is mounted to generate a vibration in the horizontal direction (Y direction or X direction). In order to suppress the vibration as caused in the vertical direction (Z direction), the electromagnetic actuator 25 is attached to generate a vibration in the vertical direction (Z direction).

In the embodiment, the displacement vibration detecting section 33 outputs a displacement vibration detection signal S1 including information on a displacement vibration frequency component proportional to the displacement vibration of the attachment 24 in the horizontal direction (Y direction). The displacement vibration includes a plurality of vibration frequency components based on first-order vibration, second-order vibration, and so forth caused by operation of the approach frame 19 and the attachment 24. The vibration frequency components included in the displacement vibration are varied depending on the structure of a transport mechanism (whether belt-type or carriage-type) provided between the AC servo motor 13 and the approach frame 19. In the embodiment, the displacement vibration detecting section 33 outputs, as the displacement vibration detection signal proportional to the displacement vibration of the attachment, a motor current signal of the servomotor 13 used in the positioning servomechanism operable to move the approach frame 19 in the horizontal direction (Y direction), or a torque signal of the motor, or a signal proportional to the motor current signal or the torque signal. It is necessary that the attachment 24 of the apparatus 1 should be advanced into a space between two molding dies. Therefore, there is a limit to the increase in size of the attachment 24 to which the electromagnetic actuator 25 is mounted, and there is little room in proximity of the molding die to dispose a sensor operable to detect motions of the attachment 24 to which the electromagnetic actuator 25 is mounted. For such reasons, even though technicians would have thought that the active control might be effective in suppressing the vibration of the attachment 24, it has not been proposed to suppress the vibration of the pickup head by active control.

The inventors, who studied application of the active control to the apparatus for taking out a molded product, has found that a displacement vibration frequency component proportional to the displacement vibration of the attachment 24 as caused in the horizontal direction or the vertical direction is included in a motor current signal of the motor used in the servomechanism operable to move the approach frames in the horizontal direction or the vertical direction, or a torque signal of the motor, or a signal proportional to the motor current signal or the torque signal, and that there is no need to dispose at the attachment 24 a sensor operable to measure the vibration of the attachment 24 as caused in the horizontal direction or the vertical direction or to dispose around the molding die a sensor operable to measure the vibration of the pickup head as caused in the horizontal direction.

Thus, in the embodiment, the displacement vibration detecting section 33 detects, as the displacement vibration detection signal S1, a motor current signal of the servomotor 13 used in the servomechanism operable to move the approach frame 19 in the horizontal direction (Y direction), or a torque signal of the motor, or a signal proportional to the motor current signal or the torque signal. If information on the displacement vibration frequency component is obtained from the signal S1, it is no longer necessary to dispose around the attachment 24 or the molding die a sensor operable to detect the vibration of the attachment 24 in the horizontal direction (Y direction). As a result, it has become practically possible to apply the active control to the apparatus for taking out a molded product. In the embodiment, in order to actively suppress the vibration of the approach frame 19 in the horizontal direction (Y direction), the displacement vibration detecting section 33 acquires a motor current signal or a torque signal from an output from a motor driving amplifier 12 for the servomotor 13. In order to suppress the vibration of the approach frame 19 as caused in the vertical direction, the electromagnetic actuator 25 may be driven based on a motor current signal or a torque signal acquired from an output from a motor driving amplifier for a motor operable to move the approach frame 19 in the vertical direction. In this case, the mounting position of the electromagnetic actuator 25 may be varied such that the electromagnetic actuator 25 generates vibration in the vertical direction. As discussed later, the attachment 24 may be mounted with a first electromagnetic actuator operable to suppress the vibration as caused in the Y direction, a second electromagnetic actuator operable to suppress the vibration as caused in the X direction, and a third electromagnetic actuator operable to suppress the vibration as caused in the Z direction.

Figure 3A:
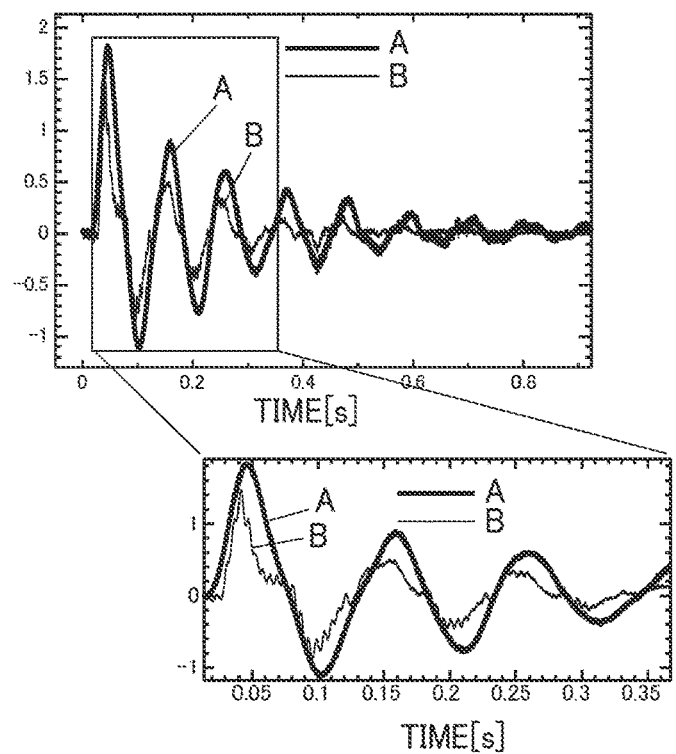
FIG. 3A is a waveform chart illustrating a vibration waveform representing the vibration of a pickup head during extraction operation as measured by a laser displacement gauge and a torque command waveform for a servomotor in contrast with each other.

FIG. 3A is a waveform chart illustrating a vibration waveform A representing the vibration of the attachment 24 during extraction operation as measured by a laser displacement gauge available from Keyence Corporation (product name: IL-S100) and a torque command waveform B for the servomotor 13 in contrast with each other. The torque command waveform B was taken from a torque command output terminal of a servo amplifier available from Fuji Electric Co., Ltd. (product name: RYT201D5-LS2-Z25).

Figure 3B:
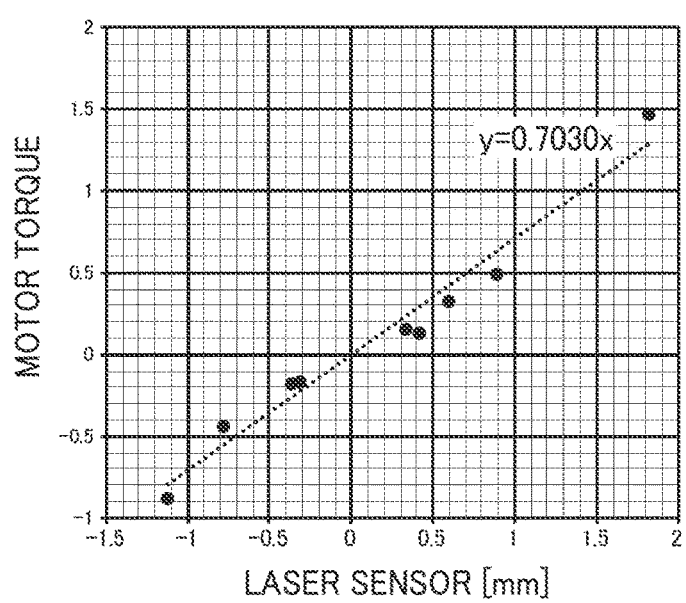
FIG. 3B illustrates the proportional relationship between the vibration waveforms indicated by the peak values of the respective vibration waveforms.

When the waveform A and the waveform B are compared with each other, it is found that the waveforms A and B are proportional to each other when seen in terms of the peak values of the waveforms although there is a phase shift therebetween. This is illustrated in FIG. 3B. This is confirmed from the result of plotting the absolute values of points on the torque command waveform and the absolute values of outputs from the laser displacement gauge. This relationship is also found to appear for the motor current signal of the motor. When focus is placed on the first peaks and the second peaks of the two waveforms, it is seen that there is a shift (lead) of 0.03 to 0.04 seconds between the two waveforms.

The phase shift correcting section 34 corrects a phase shift of the displacement vibration detection signal S1 outputted from the displacement vibration detecting section 33 based on predetermined phase shift information, and generates a corrected displacement vibration detection signal S1'. A phase shift due to various factors such as the configuration of the displacement vibration detecting section 33 is caused between the displacement vibration detection signal S1 and the actual displacement vibration. Once setting is completed for the apparatus for taking out a molded product, the shapes and the weights of the attachment 24 and the molded product to be taken out will not be varied. Thus, the phase shift can be calculated in advance by a prior measurement performed before pickup operation is started. Then, in the embodiment, a phase shift of the displacement vibration detection signal S1 is corrected based on predetermined phase shift information to generate a corrected displacement vibration detection signal S1' to prevent oscillation based on the phase shift.

The additional vibration detecting section 35 detects additional vibration as caused in the horizontal direction (Y direction) generated by the electromagnetic actuator 25, and outputs an additional vibration detection signal S2' including information on an additional vibration frequency component of the additional vibration. If vibration suppressing operation is performed by causing the electromagnetic actuator 25 to operate using only the corrected displacement vibration detection signal S1', an additional vibration frequency component of the electromagnetic actuator 25 in the horizontal direction is included in the displacement vibration frequency component. If the additional vibration frequency component is not taken into consideration, however, the vibration cannot be quickly suppressed using the electromagnetic actuator 25 without causing oscillation. In the embodiment, the additional vibration detecting section 35 is constituted from an acceleration sensor 27 attached to a mover of the electromagnetic actuator 25 and operable to detect an acceleration of the mover. Currently, a semiconductor acceleration sensor, for example, may be used as the acceleration sensor 27. Semiconductor acceleration sensors sized to be attachable to the mover are commercially available. In the embodiment, an acceleration sensor available from Kionix, Inc. (product name: KXR94-2050) is used.

The drive signal generating section 37 generates a drive signal required for active control of the electromagnetic actuator 25 so as to suppress the vibration of the attachment 25 as caused in the horizontal direction (Y direction), based on the displacement vibration frequency component included in the corrected displacement vibration detection signal S1' and the additional vibration frequency component included in the additional vibration detection signal. Only with a drive signal for driving the actuator that is generated based only on the displacement vibration detection signal S1 including information on the displacement vibration frequency component, vibration may not be fully suppressed.

This is because the additional vibration (additional vibration frequency component) generated by vibration of the actuator is included in the displacement vibration frequency component. Then, a drive signal Sa is obtained for use by removing the additional vibration detection signal S2' from the corrected displacement vibration detection signal S1'. The corrected displacement vibration detection signal S1' is obtained by correcting the phase of the detection signal S1 including information on the displacement vibration frequency component. The additional vibration detection signal S2' is proportional to the speed obtained by integrating an acceleration signal S2 from the acceleration sensor 27 including information on the additional vibration frequency component due to the additional vibration of the vibrator of the electromagnetic actuator 25 operable to generate a vibration for suppressing vibration of the attachment 24 as caused in the horizontal direction. Consequently, it is possible to increase attenuation of the additional vibration to prevent oscillation, thereby making the active control using the electromagnetic actuator 25 more effective. As a result, it is possible to reliably suppress the vibration of the attachment 24 in a short time compared to the related art.

Figure 4:
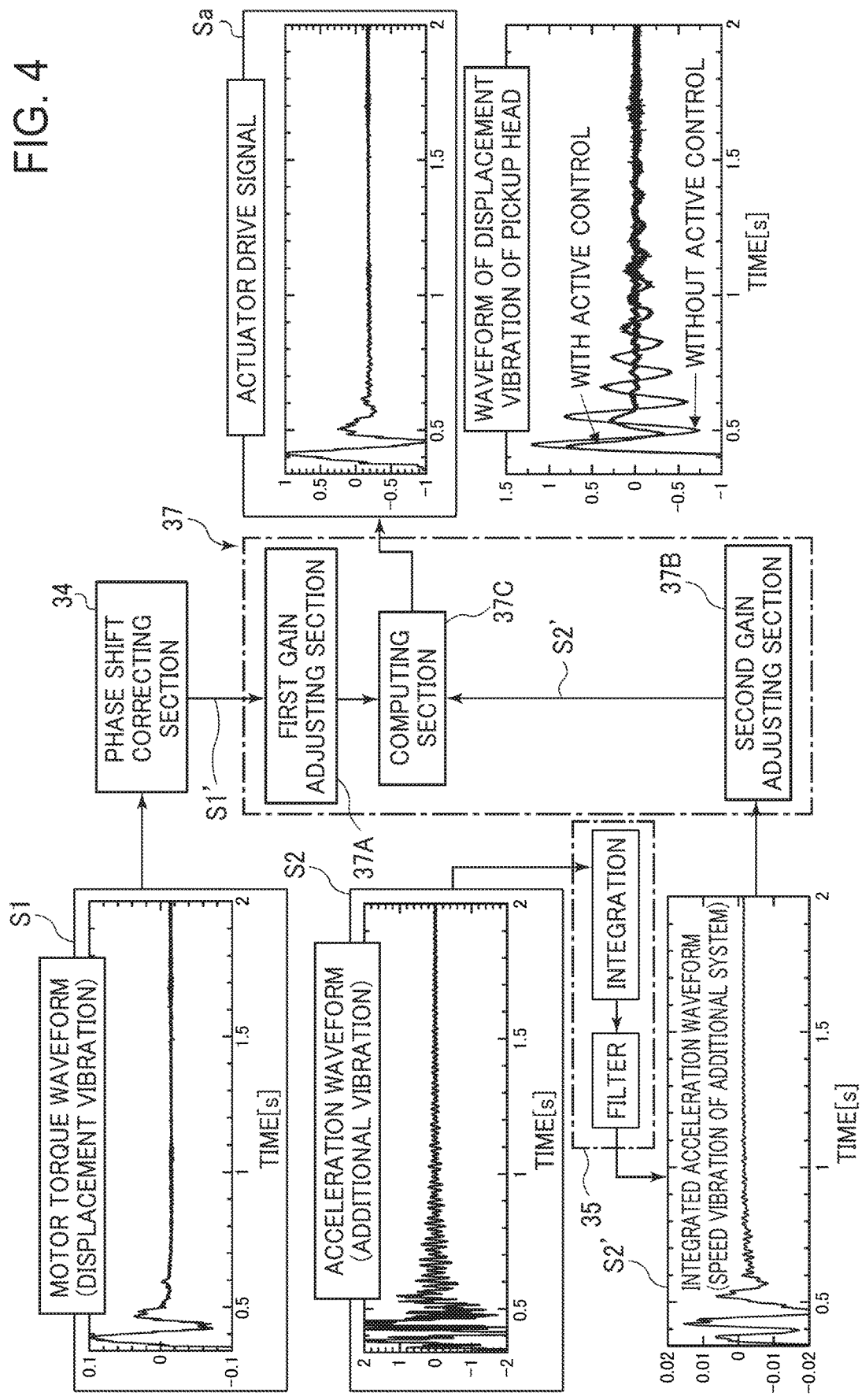
FIG. 4 illustrates the course of generating a drive signal for an actuator using waveforms.

FIG. 4 illustrates, together with waveforms, the configuration and process of generating the drive signal Sa for the electromagnetic actuator. As illustrated in FIG. 4, the drive signal generating section 37 includes a first gain adjusting section 37A, a second gain adjusting section 37B, and a computing section 37C. The first gain adjusting section 37A adjusts the gain of the corrected displacement vibration detection signal S1' outputted from the phase shift correcting section 34. The second gain adjusting section 37B adjusts the gain of the additional vibration detection signal S2' outputted from the additional vibration detecting section 35. The first gain adjusting section 37A and the second gain adjusting section 37B enable computation by adjusting the difference in dimension and amplitude between the corrected displacement vibration detection signal S1' and the additional vibration detection signal S2'. The computing section 37C executes computation to remove the additional vibration detection signal S2', which has been subjected to the gain adjustment, from the corrected displacement vibration detection signal S1' which has been subjected to the gain adjustment in order to reduce or remove the effect due to the additional vibration frequency component generated by the additional vibration of the actuator and included in the displacement vibration frequency component. If the polarity of the output from the acceleration sensor 27 is negative, the computing section 37C performs an addition.

The active vibration suppressing system 31 is preferably operating at all times when the apparatus for taking out a molded product is in operation. With this arrangement, the vibration of the attachment 24 is suppressed at all times. Thus, it is possible to take out a molded product without deforming the molded product, and to prevent the molded product, which has not been completely cured, from being deformed after being taken out by the pickup head. In addition, the molded product can be taken out early and reliably by the attachment 24 if the active vibration suppressing system 31 is operating at least when the attachment 24 is being stopped in the molding die.

Further, the active vibration suppressing system 31 may be operating when the attachment 24 is being stopped at a releasing position. With this arrangement, it is possible to prevent the molded product, which has not been completely cured, from being deformed.

<Results of Feedback Control>

The results of verifying the effect of feedback control in the active vibration suppressing system used in the embodiment will be described below with reference to FIGS. 5 and 6. First, in FIG. 5, X0 indicates the result obtained when the active control is not performed; X1 indicates the result of the active control performed utilizing an output from a laser position sensor as the displacement vibration detection signal; and X2 indicates the result of the active control performed using the torque signal waveform S1 as the displacement vibration detection signal and using the corrected displacement vibration detection signal S1' obtained by correcting a phase shift (lead) of 0.02 seconds as in the embodiment. The settling time is the time since a target position is reached until the amplitude of vibration of the reverse unit 21 falls within ±0.1 mm. From these results, it was confirmed that the same vibration suppression effect as the effect obtained when the laser displacement gauge was used was obtained in the embodiment.

Figure 5:
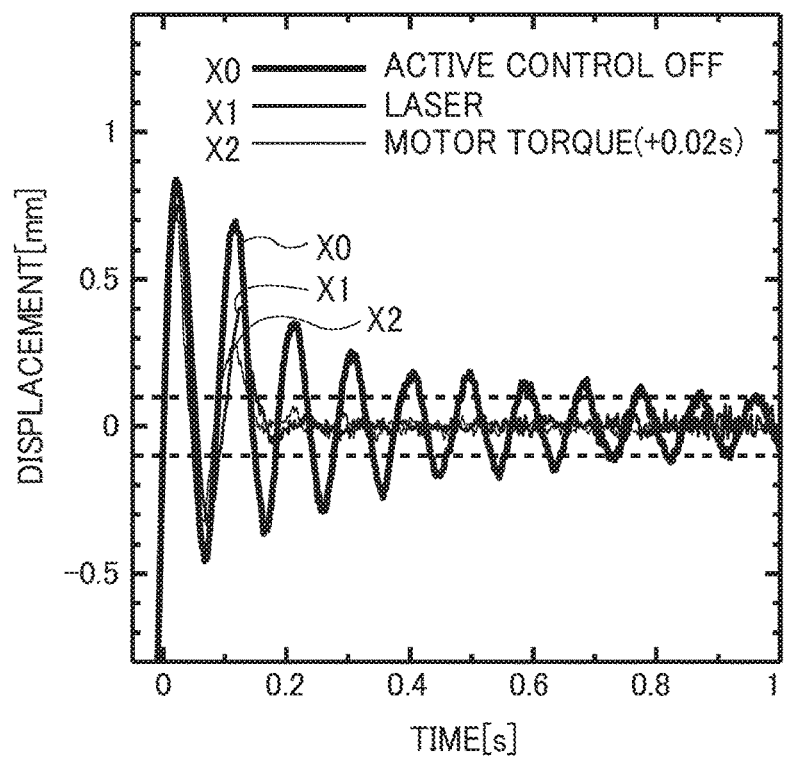
FIG. 5 is a waveform chart illustrating the result of active control in which an output from a laser displacement gauge was utilized as a displacement vibration detection signal and the result of active control according to the embodiment of the present invention.
Figure 6:
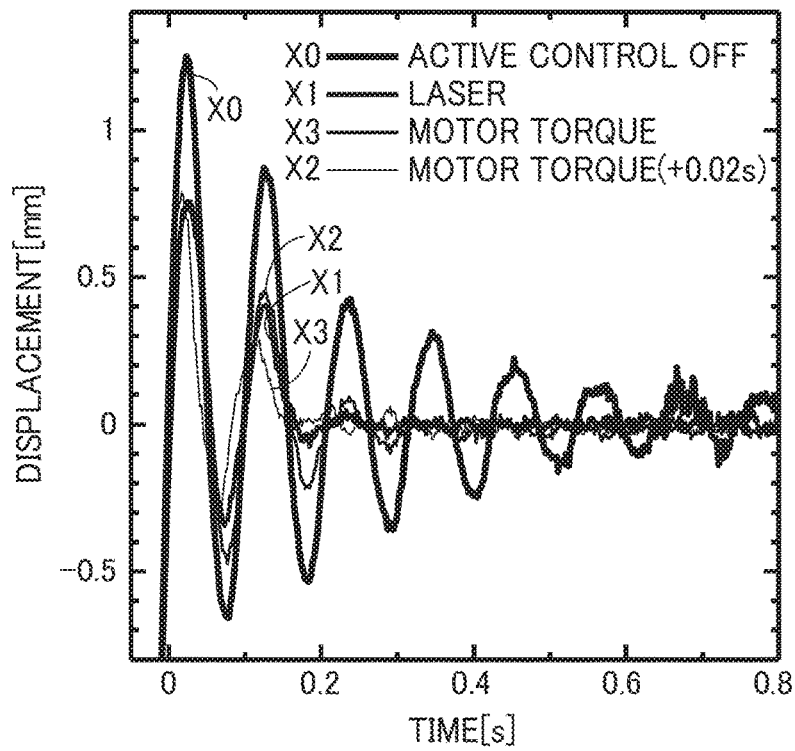
FIG. 6 is a waveform chart illustrating the result of vibration suppression without performing active control and the test result of vibration suppression without performing phase correction, in addition to the results illustrated in FIG. 5.

FIG. 6 illustrates the test result X3 of vibration suppression when phase correction was not performed in addition to the results illustrated in FIG. 5. From these test results, it was confirmed that the settling time was reduced to 0.2 seconds or less by performing phase correction.

Figure 7A:
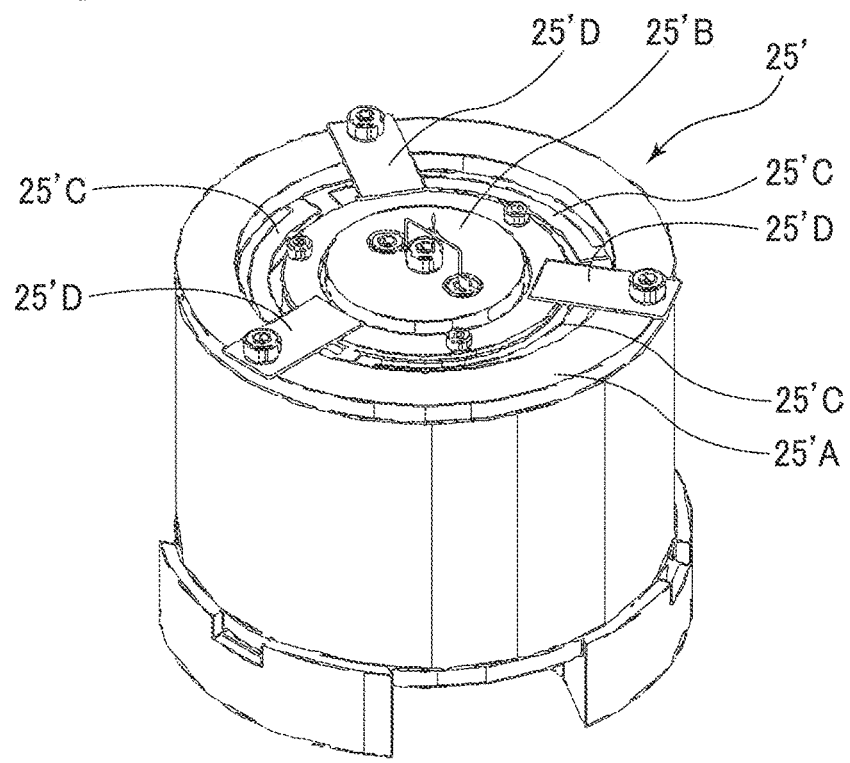
FIGS. 7A and 7B are a perspective view and a sectional view, respectively, of an example of an electromagnetic actuator that can be used in the embodiment.
Figure 7B:
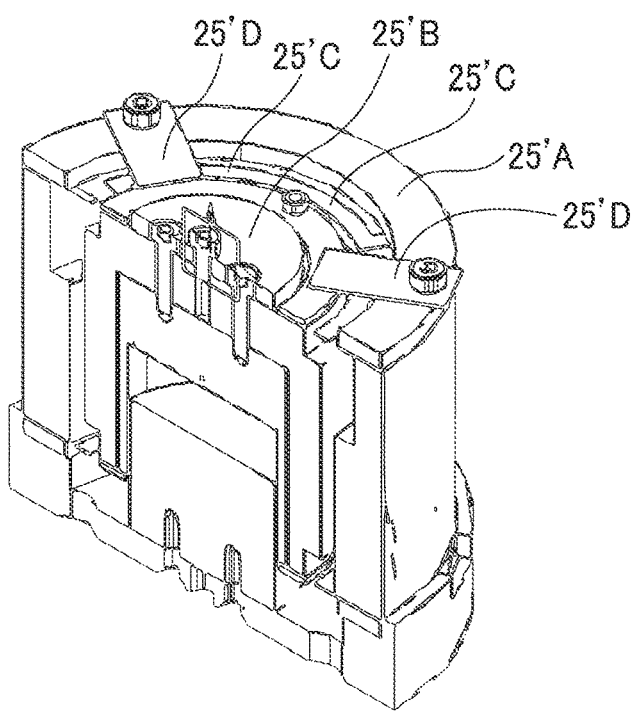

FIGS. 7A and 7B are a perspective view and a sectional view, respectively, of an example electromagnetic actuator 25' that can be used in the embodiment. In the electromagnetic actuator 25', a mover 25'B is disposed at the center portion of a tubular stator 25'A, and the mover 25'B is supported on the stator 25'A by three plate springs 25'C. The movable range of the mover 25'B is restricted by stoppers 25'D. The electromagnetic actuator 25' operates on the same principle as a so-called cylindrical linear motor. The stator 25'A is fixed to the pickup head, and the active control is performed when vibration of the mover 25'B is transmitted to the stator 25'A. The acceleration sensor 27 discussed earlier is attached to the mover 25'B.

Other Examples of Displacement Vibration Detecting Section

The displacement vibration detecting section 33 may be configured to output, as the displacement vibration detection signal, a displacement feedback signal of the servomotor 13 used in the positioning servomechanism operable to move the approach frame 19, or a signal proportional to the displacement feedback signal. The displacement feedback signal is obtained by integrating the "feedback speed" that can be acquired from a commercially available servo amplifier. For example, it is indicated that the "feedback speed" can be outputted in the state display block diagram illustrated on page 14-2 of the user's manual of a servo amplifier available from Fuji Electric Systems Co., Ltd. (trade name: ALPHA5).

Figure 8:
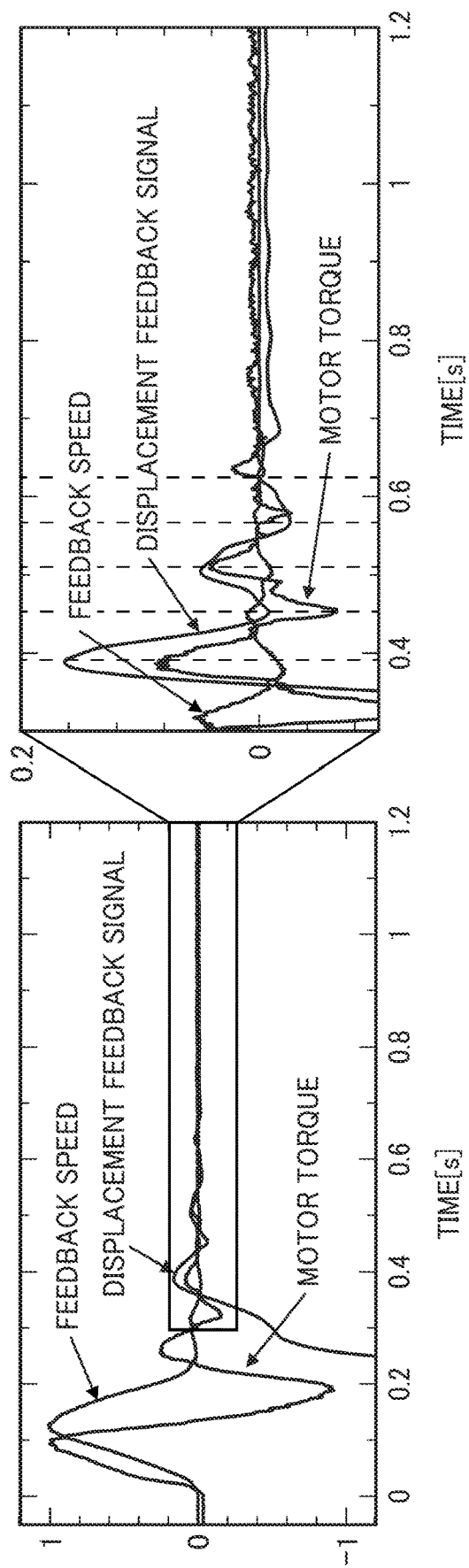
FIG. 8 is a waveform chart that is used to explain that a displacement feedback signal obtained by integrating the feedback speed is proportional to the motor torque.

FIG. 8 is a waveform chart that is used to explain that the displacement feedback signal obtained by integrating the "feedback speed" is proportional to motor torque. The waveforms in FIG. 8 illustrate the "feedback speed" outputted from the servo amplifier (ALPHA5) manufactured by and sold by Fuji Electric Systems Co., Ltd., a displacement feedback signal derived by adding a time lead compensation (40 ms) to the result of integrating the "feedback speed", and the waveform of the motor torque of the servomotor driven by the servo amplifier. The time lead compensation of 40 ms means that the phase of the integral value is delayed by an amount corresponding to a lead time calculated based on a prior measurement. As is clearly known from FIG. 8, the displacement feedback signal is in phase with the motor torque, and thus the displacement feedback signal can also be used as the displacement vibration detection signal as with the motor torque as discussed earlier.

Other Examples of Additional Vibration Detecting Section

Figure 9:
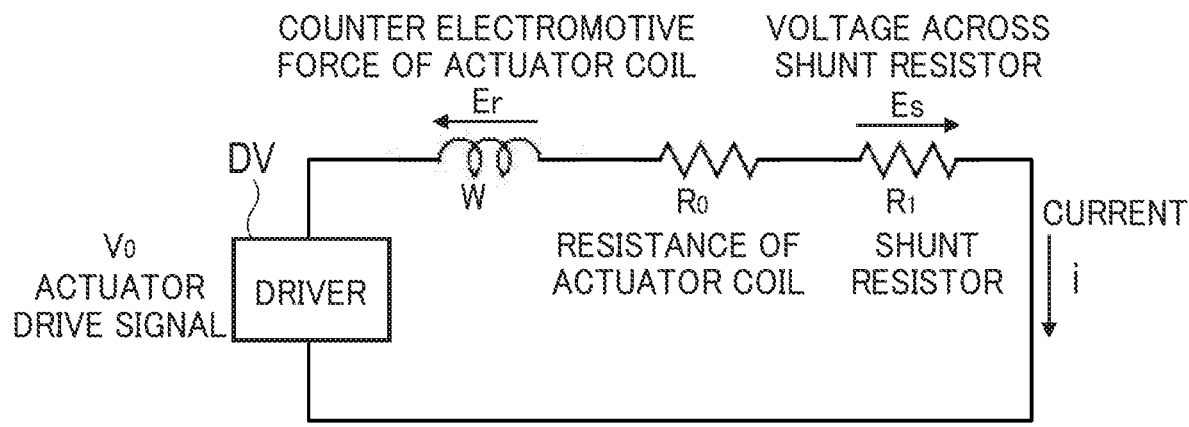
FIG. 9 illustrates an example circuit operable to acquire a signal proportional to a counter electromotive force generated in an excitation coil operable to excite a mover of the electromagnetic actuator.

In the embodiment described above, the acceleration sensor 27 is used as the additional vibration detecting section 35. However, the additional vibration detecting section 35 can also be constituted without using an acceleration sensor as with the displacement vibration detecting section 33. That is, the additional vibration detecting section 35 may be configured to detect a signal proportional to a counter electromotive force caused when an electric power proportional to the drive signal is supplied to the electromagnetic actuator, and to output the detected signal proportional to the counter electromotive force as the additional vibration detection signal. FIG. 9 illustrates an example circuit operable to utilize a voltage Es across both ends of a shunt resistor with a resistance value R1 in which current i flows, a voltage Vo applied to a driver DV, and a resistance value Ro of an excitation coil W operable to excite the mover of the electromagnetic actuator 25, in order to acquire a signal proportional to a counter electromotive force Er generated in the excitation coil W. The voltage Es across both ends of the shunt resistor can be represented as Es=R1×i=R1×(Vo−Er)/(Ro+R1)=R1/(Ro+R1)×(Vo−Er)=k(Vo−Er). It should be noted, however, that k is a known proportionality constant represented as k=R1/(Ro+R1). From the above formula, the counter electromotive force Er can be calculated as Er=Vo−Es/k.

Figure 10:
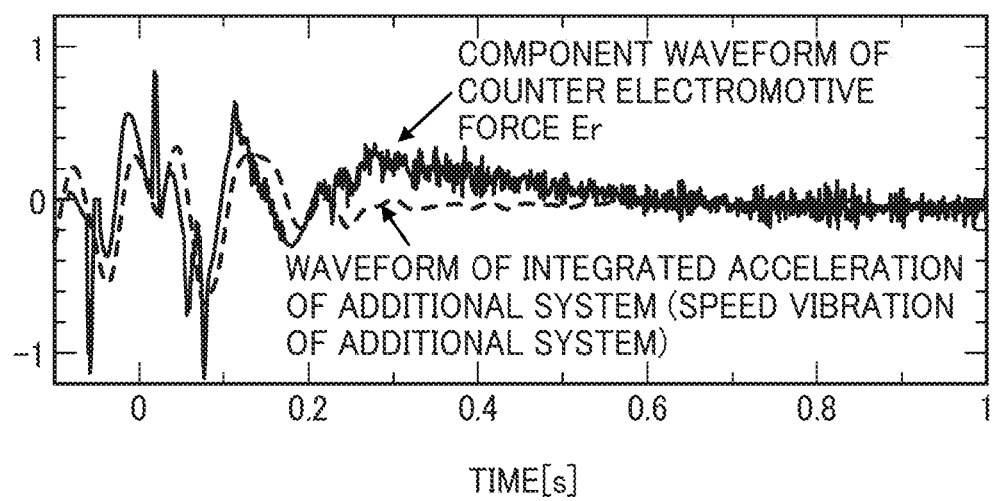
FIG. 10 is a waveform chart illustrating a component waveform of a counter electromotive force as obtained from computation and a waveform of integrated acceleration of an additional system (additional vibration detection signal) detected by an acceleration sensor.

FIG. 10 is a waveform chart illustrating a component waveform of the counter electromotive force Er obtained from computation and a waveform of integrated acceleration of an additional system (additional vibration detection signal) detected by the acceleration sensor 27. As is known from the chart, the component waveform of the counter electromotive force Er obtained from computation and the waveform of the integrated acceleration (additional vibration detection signal) are in phase with each other. Thus, a signal proportional to the counter electromotive force Er can be used as the additional vibration detection signal.

Figure 11:
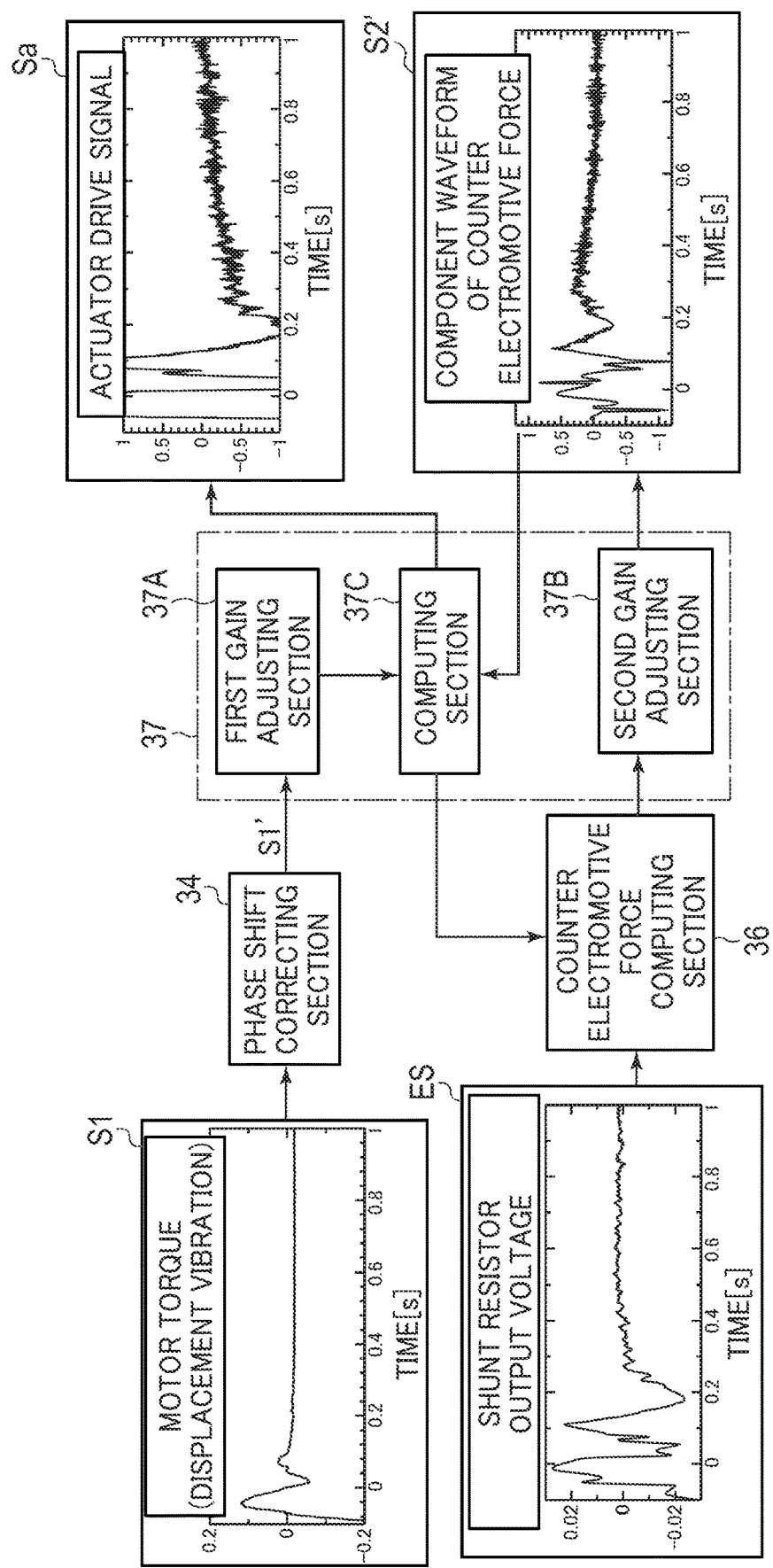
FIG. 11 illustrates, together with the waveforms, the configuration and process of generating a drive signal for the electromagnetic actuator using, as the additional vibration detection signal, the component waveform of the counter electromotive force calculated using a voltage outputted from a shunt resistor.

FIG. 11 illustrates, together with the waveforms, the configuration and process of generating a drive signal Sa for the electromagnetic actuator using, as the additional vibration detection signal, the component waveform of the counter electromotive force calculated using the voltage outputted from the shunt resistor. As illustrated in FIG. 11, the drive signal generating section 37 includes a first gain adjusting section 37A, a second gain adjusting section 37B, and a computing section 37C. The first gain adjusting section 37A adjusts the gain of the corrected displacement vibration detection signal S1' outputted from the phase shift correcting section 34. The second gain adjusting section 37B adjusts the gain of the additional vibration detection signal S2' outputted from a counter electromotive force computing section 36 constituting the additional vibration detecting section. The counter electromotive force computing section 36 computes a counter electromotive force Er based on the formula Er=Vo−Es/k discussed earlier. The first gain adjusting section 37A and the second gain adjusting section 37B enable computation by adjusting the difference in dimension and amplitude between the corrected displacement vibration detection signal S1' and the additional vibration detection signal S2'. The computing section 37C executes computation to remove the additional vibration detection signal S2' which has been subjected to the gain adjustment from the corrected displacement vibration detection signal S1' which includes the component waveform of the counter electromotive force which has been subjected to the gain adjustment in order to reduce or remove the effect due to the additional vibration frequency component generated by the additional vibration of the actuator and included in the displacement vibration frequency component. If the polarity of the component waveform of the counter electromotive force is negative, the computing section 37C performs an addition.

<Operation Period>

The active vibration suppressing system 31 preferably performs active control for a period from the time before the approach frame 19 uses the attachment 24 to pick up the molded product from the molding die or to place an insert component in the molding die until the molded product is released in a releasing position. This not only increases the speed of pickup of the molded product and insertion of the insert component, but also effectively prevents the molded product from being deformed by a vibration applied before the molded product is cured.

Figure 12:
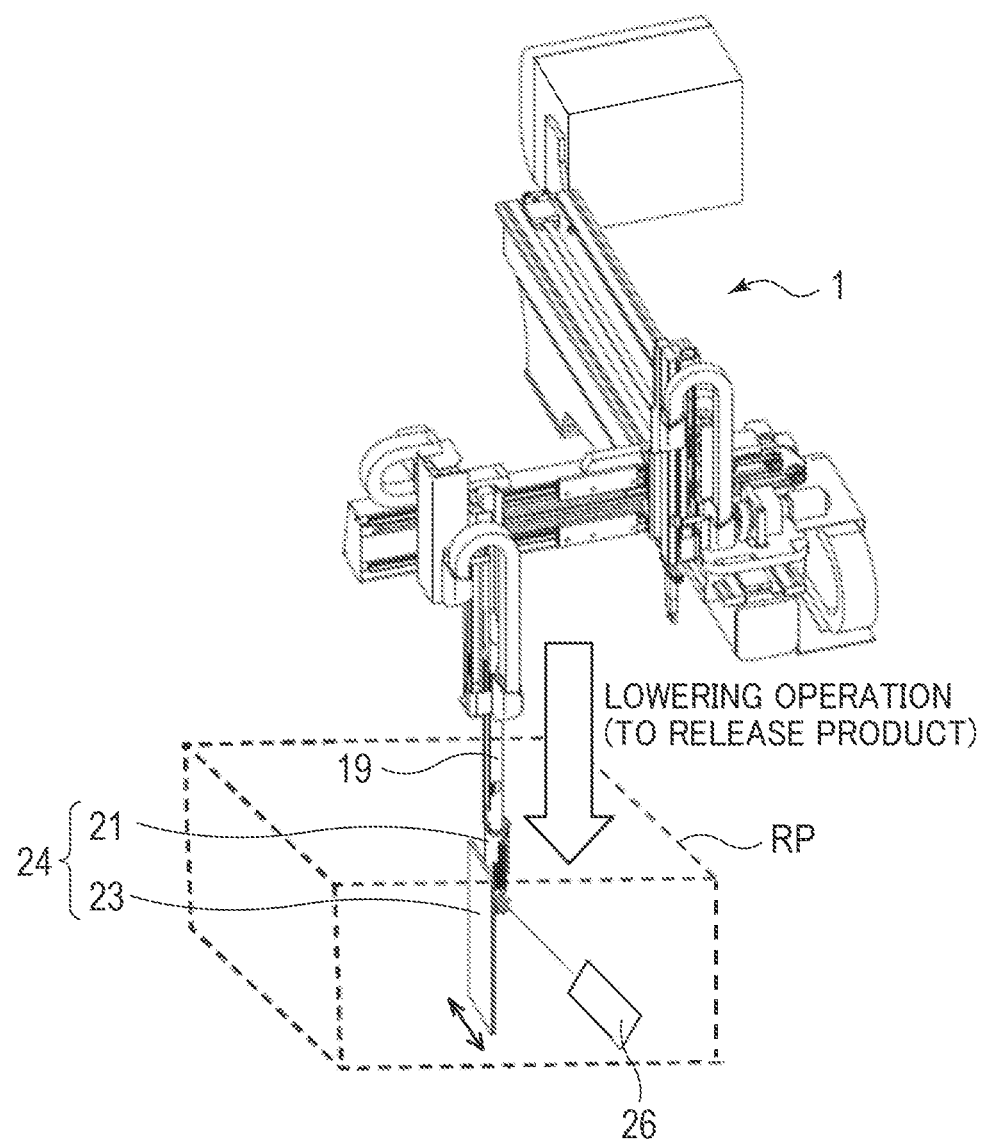
FIG. 12 illustrates active control performed to suppress lateral displacement vibration at a releasing position.

The active vibration suppressing system 31 may be operating when the attachment 24 is being stopped at a releasing position RP as illustrated in FIG. 12. With this arrangement, it is possible to prevent the molded product, which has not been completely cured, from being deformed. A displacement sensor 26 may be disposed by the side of the releasing position so as to be operable to detect the lateral displacement vibration as the attachment 24 mounted on the approach frame 19 moves toward a releasing position RP, oscillating in a lateral direction orthogonal to the horizontal direction and the vertical direction. In this case, the active vibration suppressing system 31 is configured to perform active control with an actuator (not illustrated), which is operable to suppress the lateral displacement vibration based on the output from the displacement sensor 26 mounted to the attachment 24. With this configuration, it is possible to suppress most of the vibration applied to the molded product when the molded product is released.

Second Embodiment

Figure 13A:
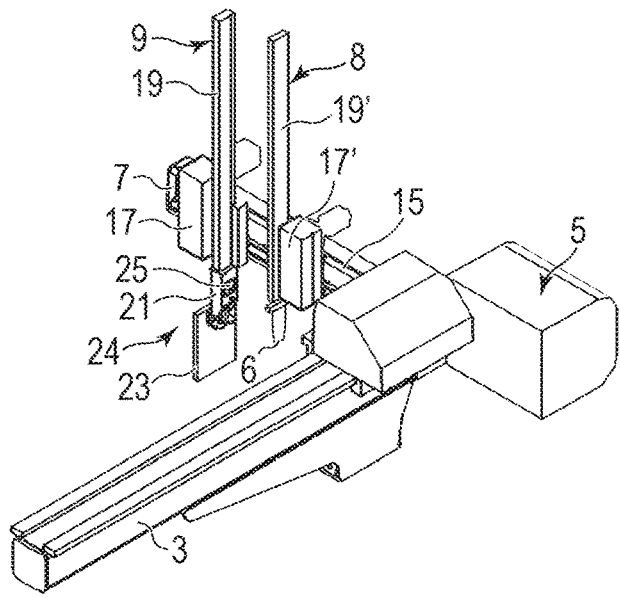
FIGS. 13A to 13D are a schematic perspective view of an apparatus for taking out a molded product according to a second embodiment of the present invention, a perspective view and a side view of an essential portion around an attachment, and a perspective view of the attachment which has been deformed, respectively.
Figure 13B:
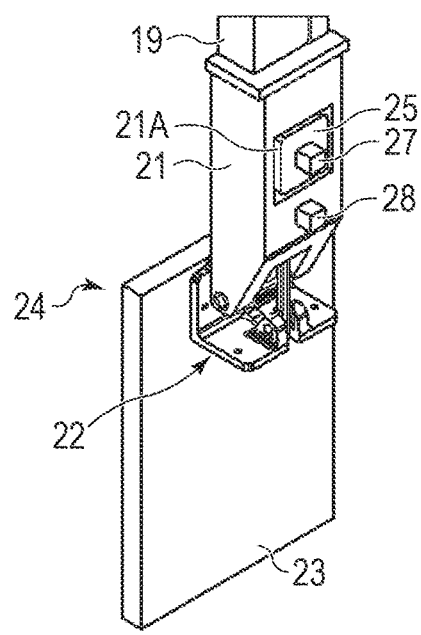
Figure 13C:
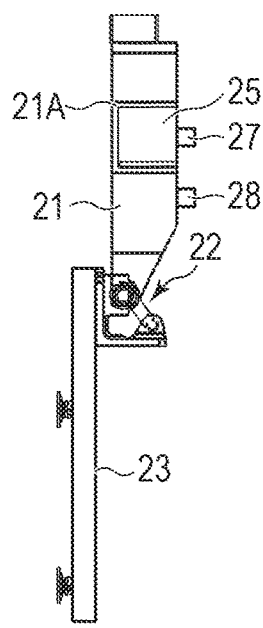
Figure 13D:
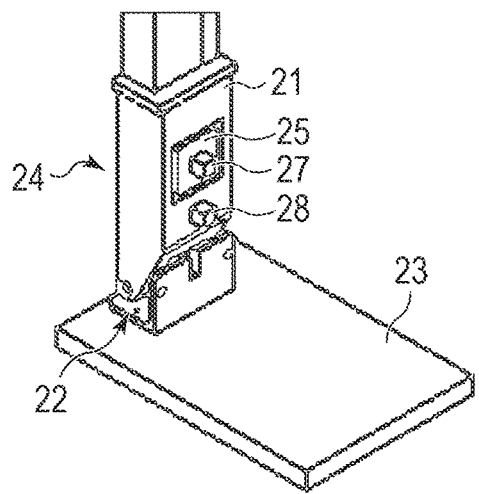

FIGS. 13A to 13D are a schematic perspective view of an apparatus for taking out a molded product according to a second embodiment of the present invention, a perspective view and a side view of an essential portion around an attachment, and a perspective view of the attachment which has been deformed, respectively. In FIGS. 13A to 13D, constituent parts that are the same as those of the apparatus for taking out a molded product according to the first embodiment illustrated in FIG. 1 are denoted by the same reference numerals as those used in FIG. 1 and the description thereof is omitted. The second embodiment differs from the first embodiment in that the reverse unit 21 serving as the posture controller includes a container portion 21A to receive the electromagnetic actuator 25, and that an acceleration sensor 28 is attached to the reverse unit 21 as a displacement vibration detecting section operable to output a displacement vibration detection signal including information on a displacement vibration frequency component proportional to the displacement vibration of the attachment 24. A pickup head fixture 22 is attached to the reverse unit 21 so as to be rotatable by 90° between a first position and a second position. The pickup head 23 extends along the approach frame 19 when the pickup head fixture 22 is situated in the first position as illustrated in FIGS. 13A to 13C. The pickup head 23 extends in a direction orthogonal to an extending direction of the approach frame 19 when the pickup head fixture 22 is situated in the second position as illustrated in FIG. 13D. The presence of the container portion 21A in the reverse unit 21 serving as the posture controller can prevent unwanted interference of the electromagnetic actuator 25 with surrounding parts.

Figure 14A:
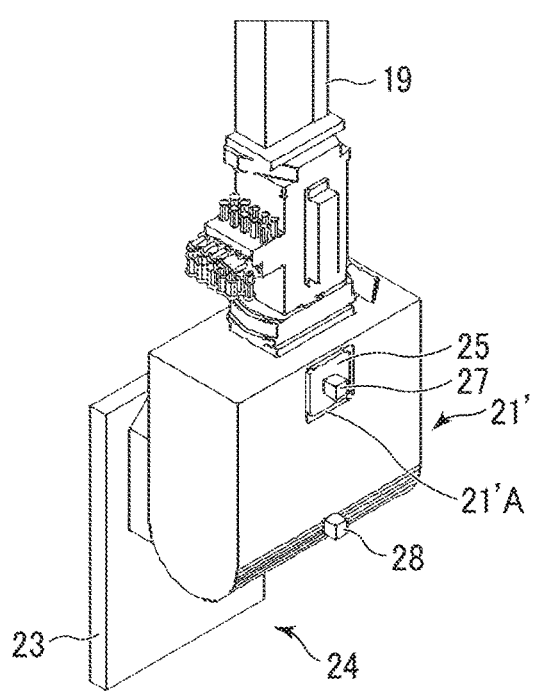
FIGS. 14A to 14C are a perspective view and a side view of an essential portion around an attachment of an embodiment wherein a rotary reverse unit, which is rotatable about a frame line of an approach frame, is used as a posture controller for the attachment, and a perspective view of the attachment which has been deformed, respectively.
Figure 14B:
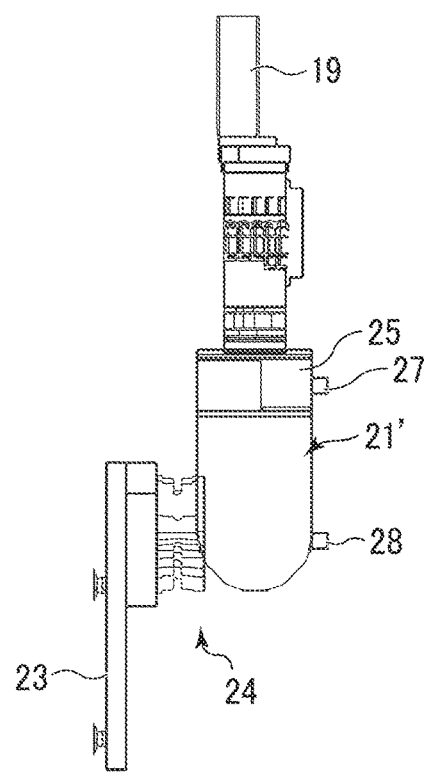
Figure 14C:
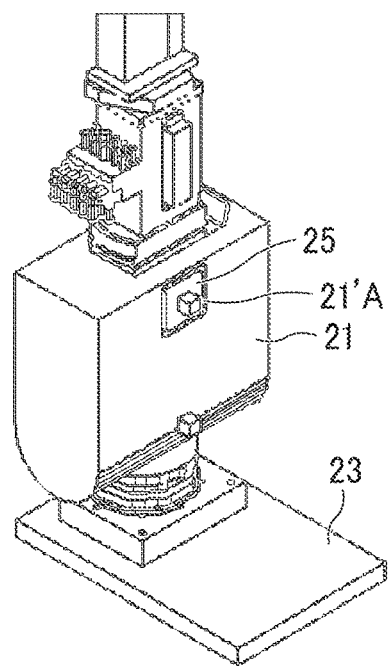

FIGS. 14A to 14C are a perspective view and a side view of an essential portion around an attachment 24 of an embodiment in which a rotary reverse unit 21', which is rotatable about a frame line of an approach frame, is used as a posture controller for the attachment 24, and a perspective view of the attachment 24 which has been deformed, respectively. Also in this example, the rotary reverse unit 21' includes a container portion 21'A to receive the electromagnetic actuator 25.

Third Embodiment

Figure 15A:
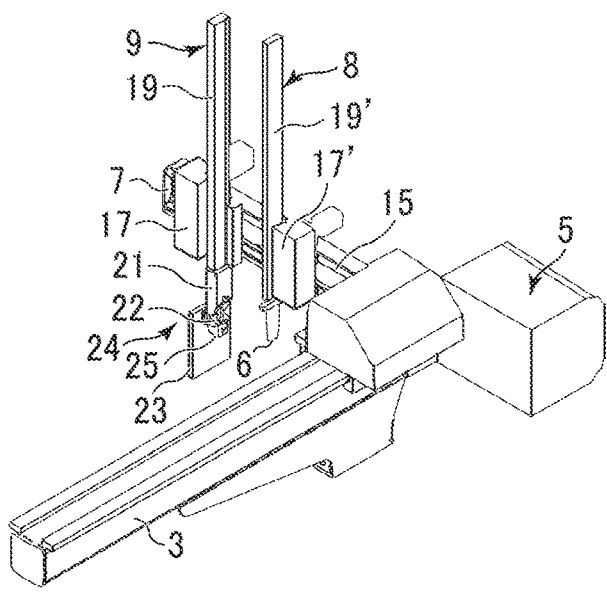
FIGS. 15A to 15D are a schematic perspective view of an apparatus for taking out a molded product according to a third embodiment of the present invention, a perspective view and a side view of an essential portion around an attachment, and a perspective view of the attachment which has been deformed, respectively.
Figure 15B:
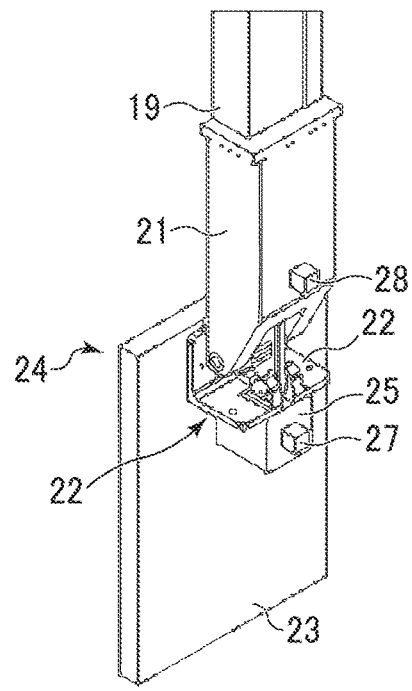
Figure 15C:
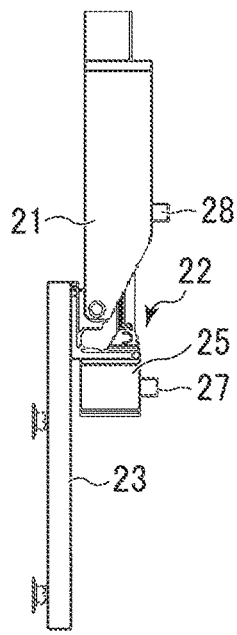
Figure 15D:
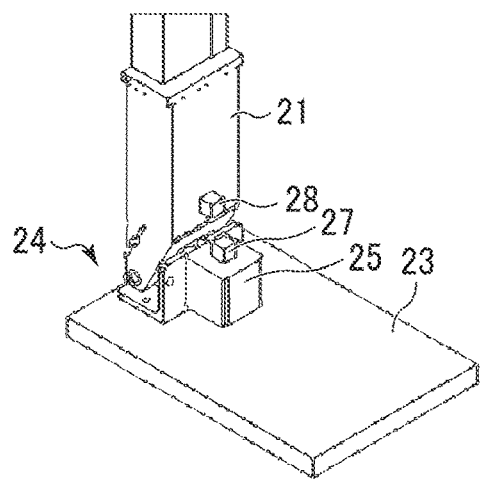
Figure 16A:
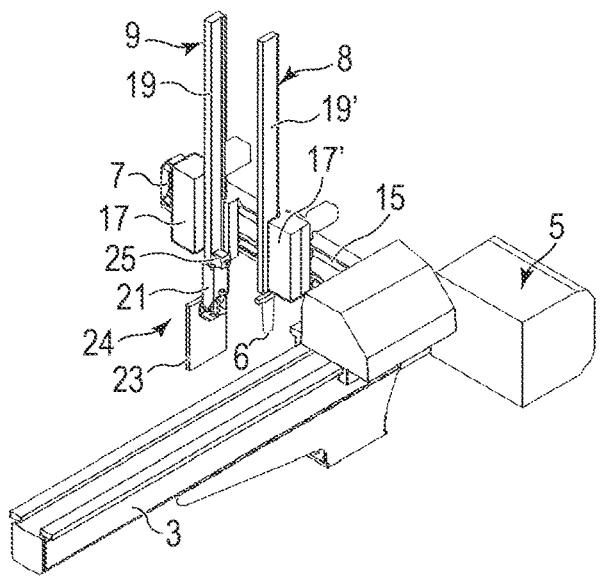
FIGS. 16A to 16D are a schematic perspective view of an apparatus for taking out a molded product according to a fourth embodiment of the present invention, a perspective view and a side view of an essential portion around an attachment, and a perspective view of the attachment which has been deformed, respectively.
Figure 16B:
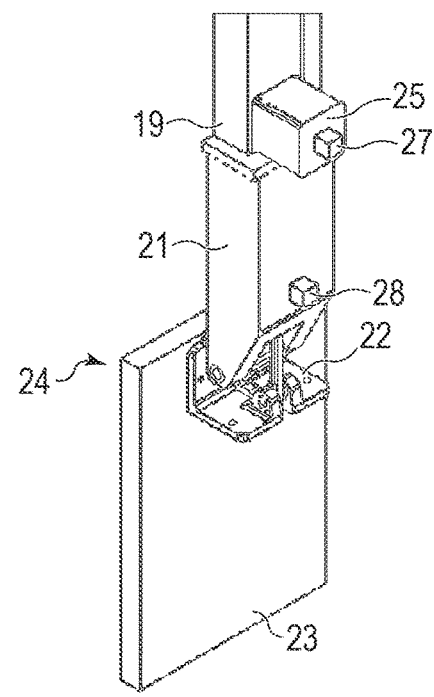
Figure 16C:
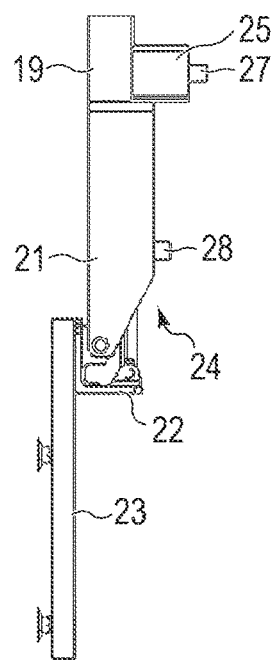
Figure 16D:
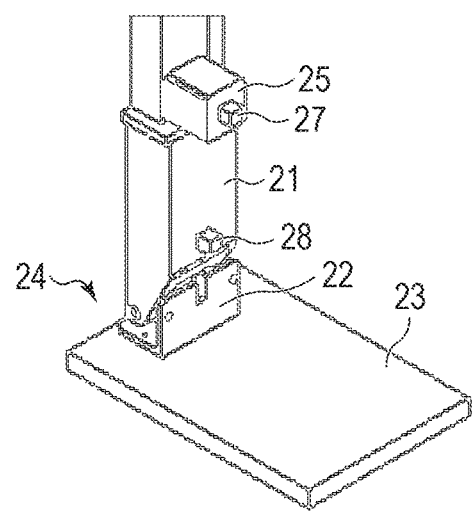

FIGS. 15A to 15D are a schematic perspective view of an apparatus for taking out a molded product according to a third embodiment of the present invention, a perspective view and a side view of an essential portion around an attachment, and a perspective view of the attachment which has been deformed, respectively. In FIGS. 15A to 15D, constituent parts that are the same as those of the apparatus for taking out a molded product according to the first embodiment illustrated in FIG. 1 are denoted by the same reference numerals as those used in FIG. 1 and the description thereof is omitted. The third embodiment differs from the first embodiment in that the electromagnetic actuator 25 is mounted on the pickup head fixture 22 disposed at the reverse unit 21 serving as the posture controller, and that an acceleration sensor 28 is attached to the reverse unit 21 as a displacement vibration detecting section operable to output a displacement vibration detection signal including information on a displacement vibration frequency component proportional to displacement vibration of the attachment 24. The pickup head 23 extends along the approach frame 19 and the electromagnetic actuator 25 is positioned below the posture controller (posture controller) 21 when the pickup head fixture 22 is situated in the first position as illustrated in FIGS. 15A to 15C, and the pickup head 23 extends in a direction orthogonal to an extending direction of the approach frame 19 and the electromagnetic actuator 25 is positioned by the side of the reverse unit (posture controller) 21 when the pickup head fixture 22 is situated in the second position as illustrated in FIG. 15D. With the use of the pickup head fixture 22, when the pickup head 23 is situated between a pair of molding dies, the electromagnetic actuator 25 is positioned below the reverse unit 21, and therefore does not collide with the molding dies. When the pickup head 23 is situated outside the pair of molding dies and in the second position as illustrated in FIG. 15D, the pickup head 23 is in a posture for releasing the molded product. Also at this time, the displacement vibration of the pickup head 23 can be suppressed by causing the electromagnetic actuator 25 to operate to perform active control.

Fourth Embodiment

FIGS. 16A to 16D are a schematic perspective view of an apparatus for taking out a molded product according to a fourth embodiment of the present invention, a perspective view and a side view of an essential portion around an attachment, and a perspective view of the attachment which has been deformed, respectively. In FIGS. 16A to 16D, constituent parts that are the same as those of the apparatus for taking out a molded product according to the first embodiment illustrated in FIG. 1 are denoted by the same reference numerals as those used in FIG. 1 and the description thereof is omitted. The fourth embodiment differs from the first embodiment in that the electromagnetic actuator 25 is mounted onto an outer periphery of the leading end of the approach frame 19 so as to be positioned in proximity to the attachment 24, and that an acceleration sensor 28 is attached to the reverse unit 21 as a displacement vibration detecting section operable to output a displacement vibration detection signal including information on a displacement vibration frequency component proportional to the displacement vibration of the attachment 24. The leading end of the approach frame 19 usually does not get into a space between a pair of molding dies. Thus, if the electromagnetic actuator 25 is disposed on the outer periphery of the leading end of the approach frame, the vibration for suppressing the displacement vibration can be efficiently applied to the attachment 24 which is located in proximity to the electromagnetic actuator 25.

Fifth Embodiment

Figure 17A:
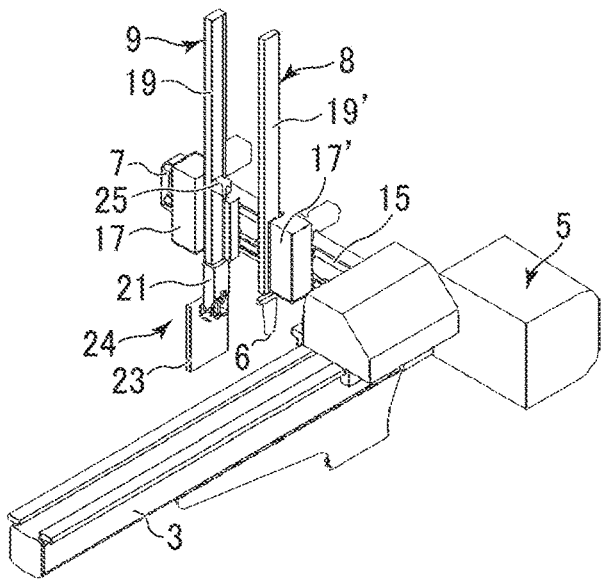
FIGS. 17A to 17C are a schematic perspective view of an apparatus for taking out a molded product according to a fifth embodiment of the present invention, and a perspective view and a side view of an essential portion around an attachment, respectively.
Figure 17B:
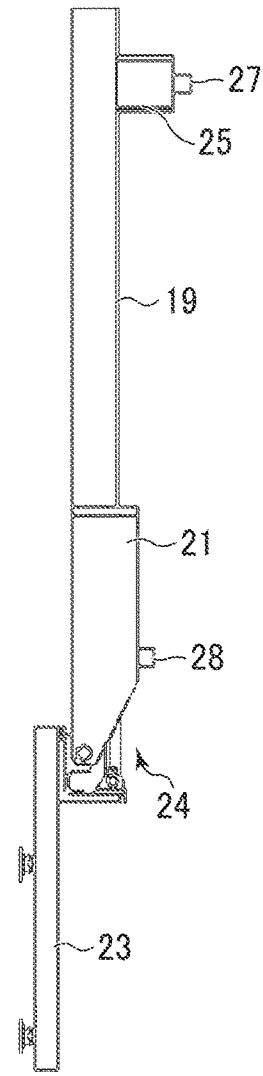
Figure 17C:
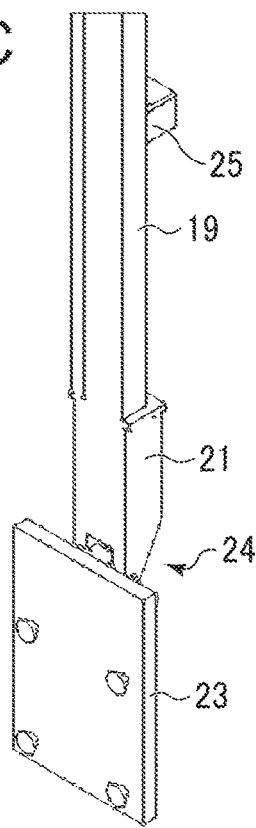

FIGS. 17A to 17C are a schematic perspective view of an apparatus for taking out a molded product according to a fifth embodiment of the present invention, and a perspective view and a side view of an essential portion around an attachment, respectively. In FIGS. 17A to 17C, constituent parts that are the same as those of the apparatus for taking out a molded product according to the first embodiment illustrated in FIG. 1 are denoted by the same reference numerals as those used in FIG. 1 and the description thereof is omitted. The fifth embodiment differs from the first embodiment in that the electromagnetic actuator 25 is mounted on a portion of the approach frame 19 located closer to the attachment 24 than to the travelling body 17, and that an acceleration sensor 28 is attached to the reverse unit 21 as a displacement vibration detecting section operable to output a displacement vibration detection signal including information on a displacement vibration frequency component proportional to the displacement vibration of the attachment 24. Also with this configuration, it is possible to apply the vibration for suppressing displacement vibration to the attachment 24 via the approach frame 19.

<Difference in Active Control Due to Difference in Mounting Position of Electromagnetic Actuator>

Figure 18:
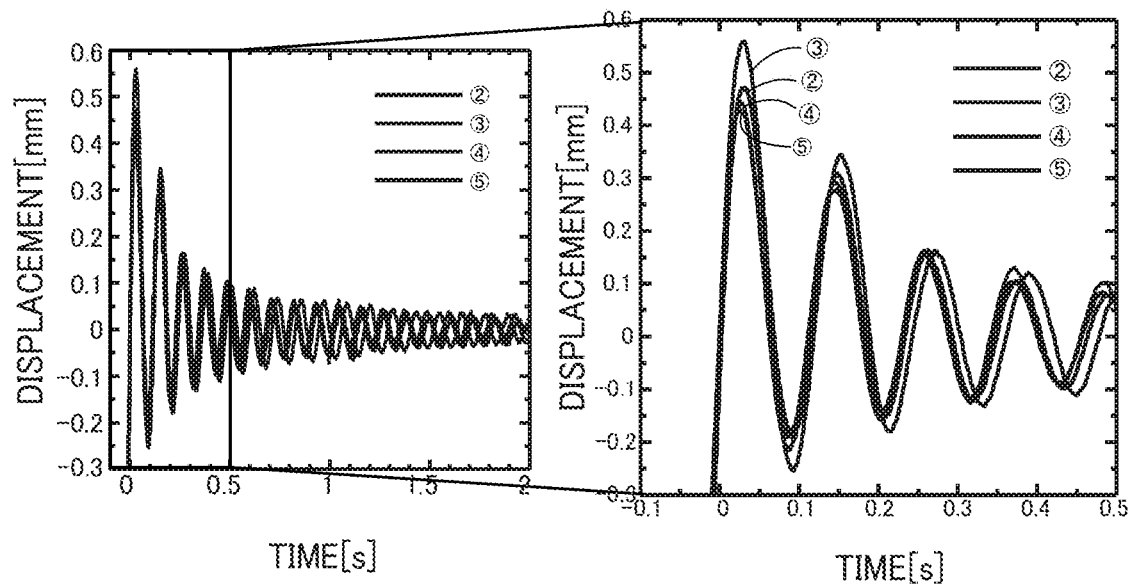
FIG. 18 illustrates the results of tests conducted to verify the difference caused when the active control was not performed, due to the difference in mounting position of the electromagnetic actuator among the second to fifth embodiments.
Figure 19:
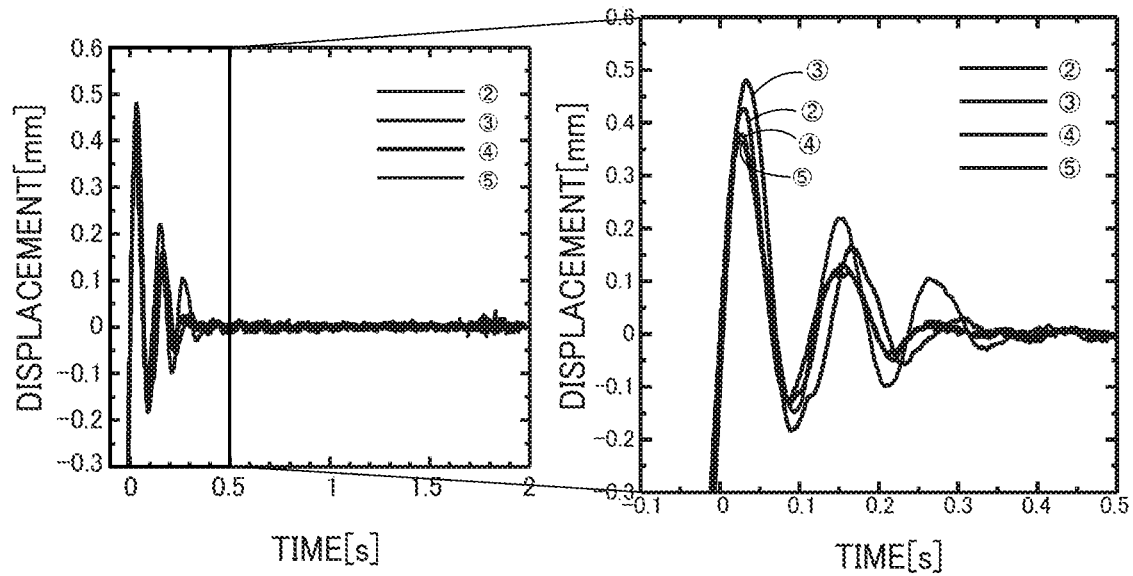
FIG. 19 illustrates the results of tests conducted to verify the difference caused when the active control was performed, due to the difference in mounting position of the electromagnetic actuator among the second to fifth embodiments.

FIGS. 18 and 19 illustrate the results of tests conducted to verify the difference in the active control due to the difference in mounting position of the electromagnetic actuator 25 among the second to fifth embodiments. In these tests, the state of vibration of the actuator during extraction operation was measured using a laser displacement gauge. In FIGS. 18 and 19, data indicated by numerals 2 to 5 are test data for the second to fifth embodiments, respectively. FIG. 18 illustrates attenuation of displacement vibration of the attachment 24 when the active control was not performed. FIG. 19 illustrates attenuation of displacement vibration of the attachment 24 when the active control was performed. As is known from the comparison between FIGS. 18 and 19, the amplitude of the displacement vibration was reduced to ±0.1 mm or less in 0.2 seconds after a target position was reached (0.0 mm) in any of the second to fifth embodiments if the active control was performed.

From these test results, it was found that the amplitude of displacement vibration was reduced in any case although initial vibration was larger due to the larger amplitude of the vibration as the electromagnetic actuator was located at a lower position.

Sixth Embodiment

Figure 20A:
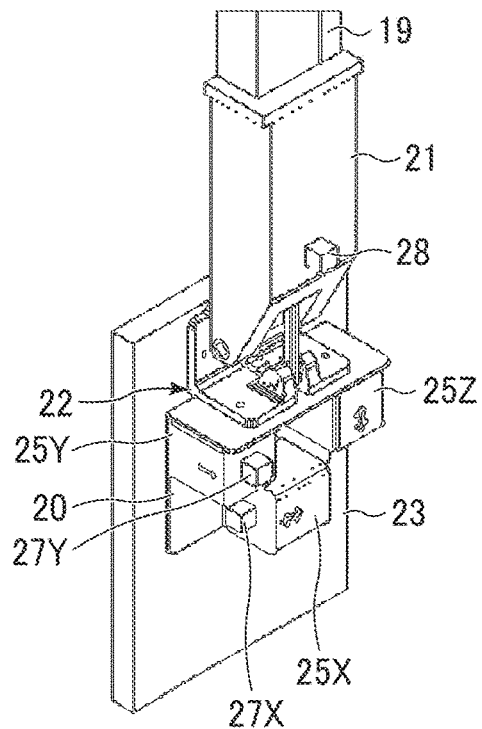
FIGS. 20A to 20C are a perspective view and a side view of an essential portion around an attachment of an apparatus for taking out a molded product according to a sixth embodiment of the present invention, and a perspective view of the attachment which has been deformed, respectively.
Figure 20B:
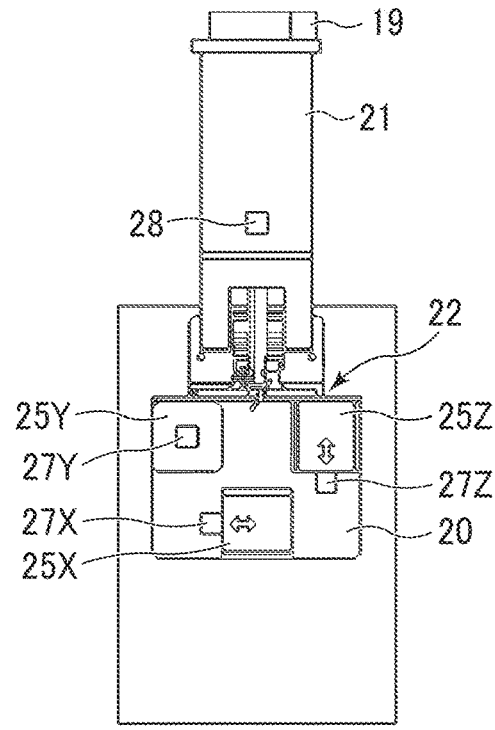
Figure 20C:
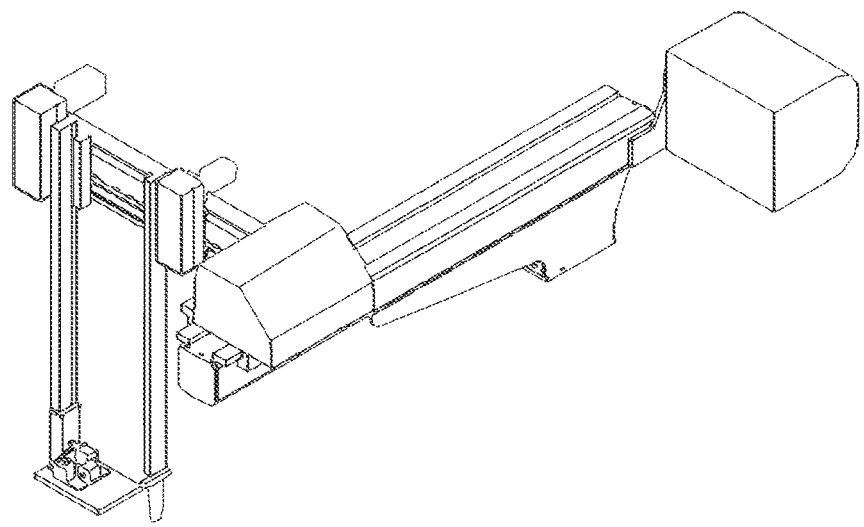

FIGS. 20A to 20C are a perspective view and a side view of an essential portion around an attachment of an apparatus for taking out a molded product according to a sixth embodiment of the present invention, and a perspective view of the attachment which has been deformed, respectively. In FIGS. 20A to 20C, constituent parts that are the same as those of the apparatus for taking out a molded product according to the third embodiment illustrated in FIG. 15 are denoted by the same reference numerals as those used in FIG. 15 and the description thereof is omitted. The sixth embodiment differs from the third embodiment in that an L-shaped mount plate 20 fixed to the pickup head 23 is mounted on the pickup head fixture 22 that is rotatable by 90° between the first position and the second position, three electromagnetic actuators 25X, 25Y, and 25Z are mounted on the mount plate 20, and acceleration sensors 27X, 27Y, and 27Z are attached to the three electromagnetic actuators 25X, 25Y, and 25Z, respectively. Defining that a Z direction denotes a direction in which the approach frame 19 moves into the molding die, a Y direction denotes a direction orthogonal to the Z direction, in which the attachment mounted on the approach frame approaches to or retracts from the molded product within the molding die, and an X direction denotes a direction orthogonal to the Y and Z directions, the three electromagnetic actuators 25X to 25Z are a first electromagnetic actuator 25Y operable to suppress the displacement vibration of the attachment as caused in the Y direction, a second electromagnetic actuator 25X operable to suppress the displacement vibration of the attachment as caused in the X direction, and a third electromagnetic actuator 25Z operable to suppress the displacement vibration of the attachment as caused in the Z direction. When the first to third electromagnetic actuators 25X to 25Z are provided, the active control can be performed at all times no matter what route the approach frame 19 is moved along and no matter what position the approach frame 19 is stopped at. FIG. 20C illustrates that the pickup head 23 is placed horizontally.

Figure 21:
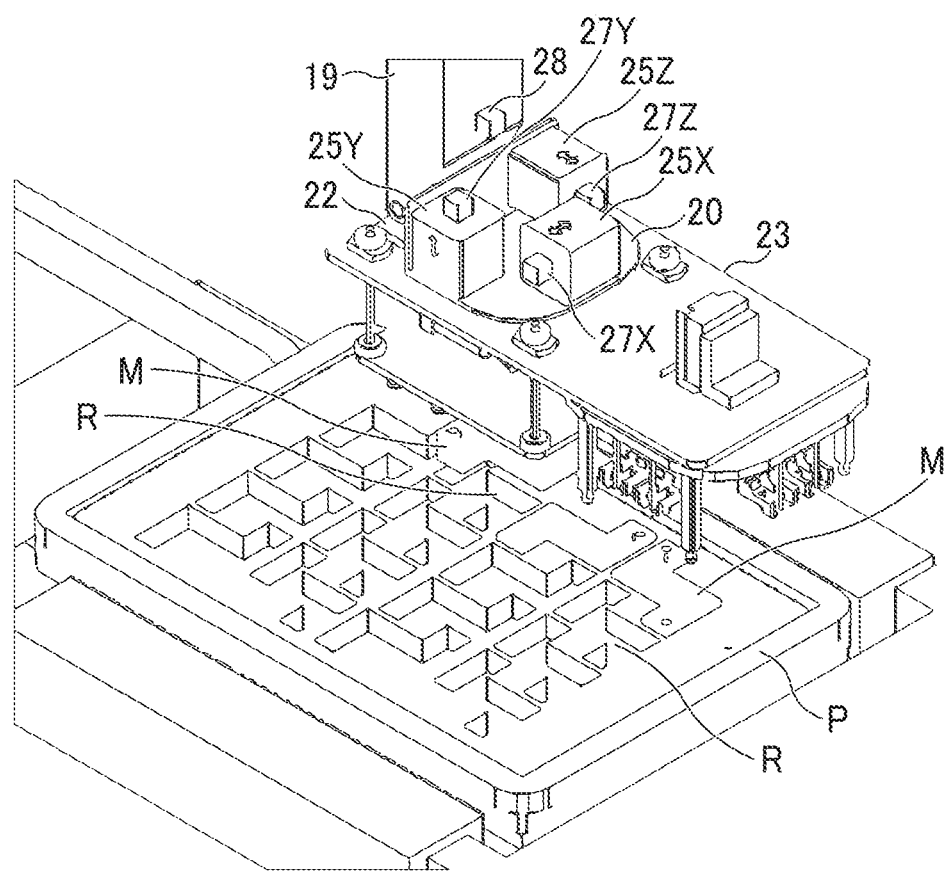
FIG. 21 illustrates an example use of the sixth embodiment.

FIG. 21 illustrates an example use of the sixth embodiment. In this example of use, a molded product M taken out by the pickup head 23 is inserted into a product-containing recess R in a pallet P placed at a releasing position. As the product-containing recess R is smaller, the molded product is rubbed more against the inner wall of the product-containing recess R as the pickup head 23 vibrates when the molded product M is inserted. As a result, the surface of the molded product may be scarred, or a part of the molded product may be deformed or damaged in some cases. In the embodiment, vibrations in the X direction, the Y direction, and the Z direction can be suppressed by the active control, and thus the molded product can be inserted into the predetermined product-containing recess R in a short time compared to the related art.

Figure 22A:
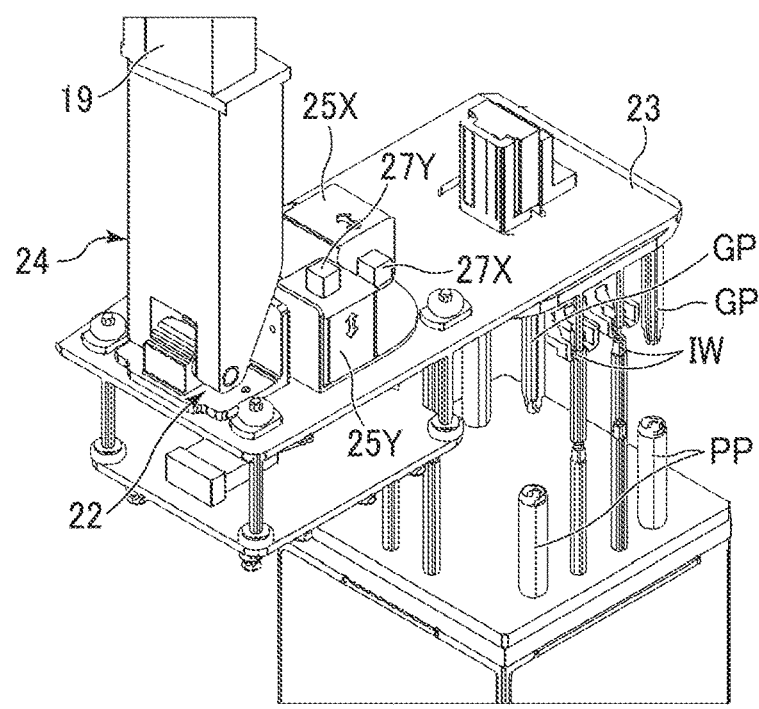
FIGS. 22A and 22B illustrate that insert components to be inserted into a molding die are received by a pickup head of the attachment mounted at the leading end of the approach frame and that the insert components are inserted into the molding die, respectively.
Figure 22B:
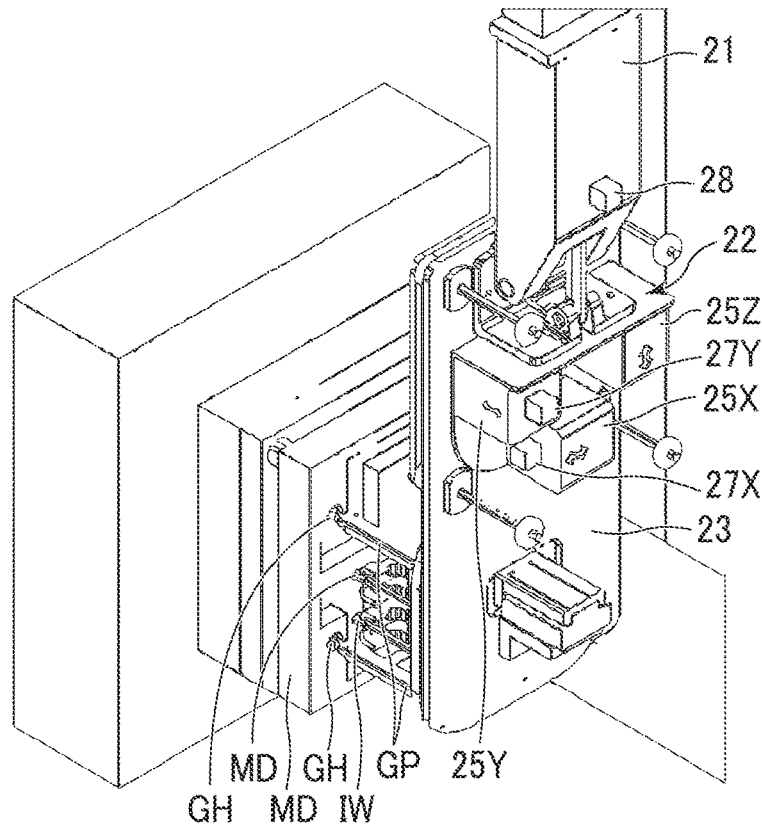

FIGS. 22A and 22B illustrate that insert components IW to be inserted into a molding die are received by the pickup head 23 of the attachment 24 mounted at the leading end of the approach frame and that the insert components IW are inserted into the molding die, respectively. The insert components IW are inserted into the molding die, and the molding machine performs insert molding such that the insert components IW are embedded in a molded product. After the molding, the apparatus for taking out a molded product takes out the molded product which has been formed by the insert molding. To take out the insert components IW, as illustrated in FIG. 22A, the insert components IW are received while inserting guide pins GP mounted to the pickup head into positioning pins PP disposed at a part containing portion. To insert the insert components IW into a molding die MD, as illustrated in FIG. 22B, the guide pins GP are inserted into guide holes GH formed in the molding die MD to position the insert components IW at a predetermined position. In such cases, it may take time to take out and insert the insert components IW if the pickup head 23 is vibrating. If the first to third electromagnetic actuators 25X to 25Z are provided as in the embodiment, however, the vibration of the pickup head 23 can be suppressed early by the active control. Thus, it is possible to reduce the time for pickup and insertion of the insert components compared to the related art.

Figure 23A:
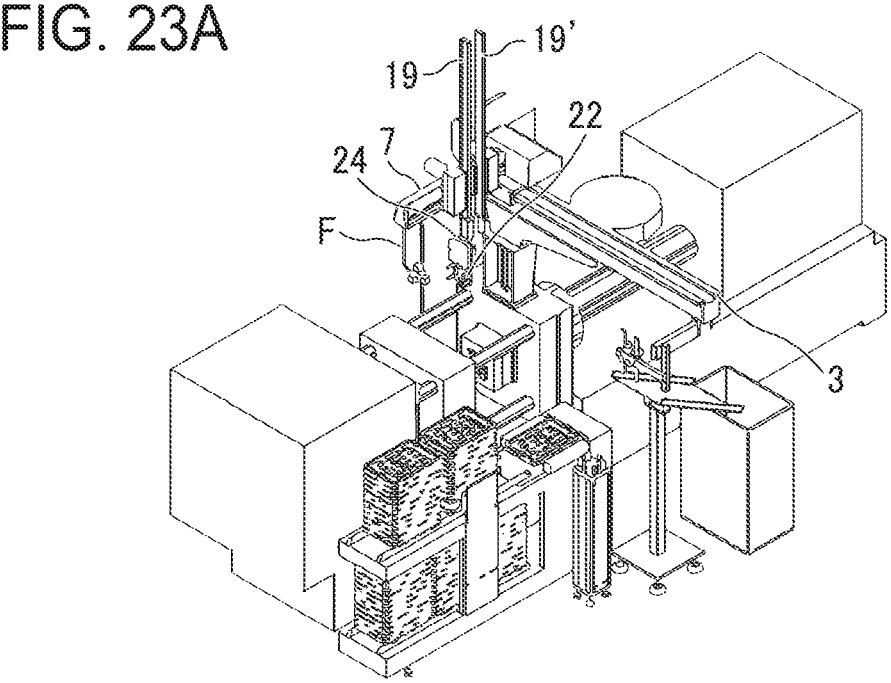
FIGS. 23A to 23C are a schematic perspective view illustrating an example use in which the state of a molded product taken out by the pickup head of the attachment mounted at the leading end of the approach frame is inspected by a camera inspection unit, and enlarged perspective views of an essential portion as seen from different directions, respectively.
Figure 23B:
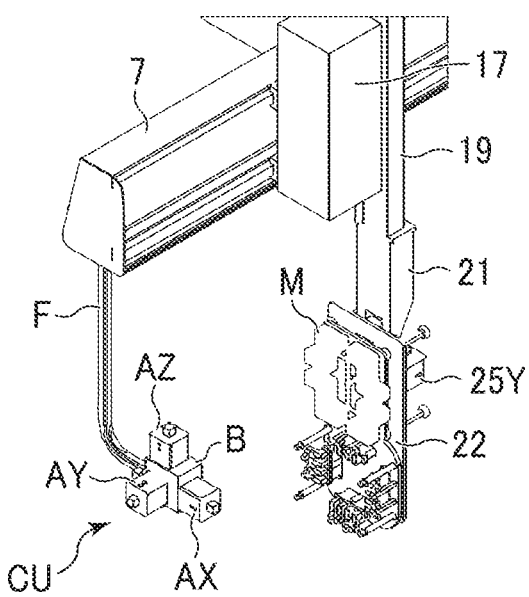
Figure 23C:
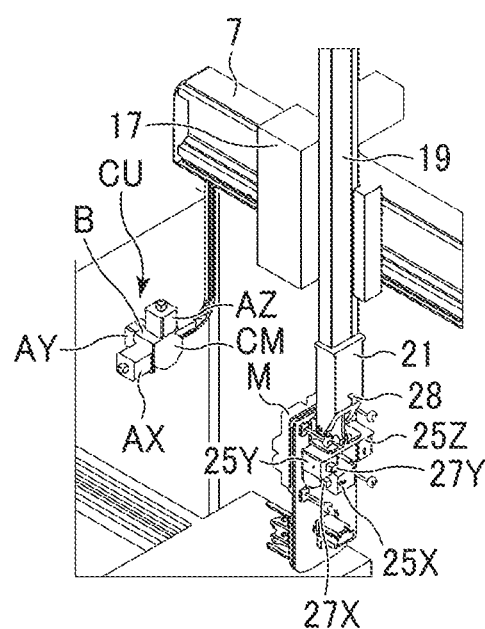

FIGS. 23A to 23C are a schematic perspective view illustrating an example use in which the state of the molded product M taken out by the pickup head 23 of the attachment 24 mounted at the leading end of the approach frame is inspected by a camera inspection unit CU, and enlarged perspective views of an essential portion as seen from different directions, respectively. In this example, the camera inspection unit CU includes three actuators AY, AX, and AZ mounted around a leading-end base B of a frame F to which a camera CM is attached. The vibration of the leading-end base B of the frame F as caused in three directions of the frame is suppressed by the active control using the three actuators AY, AX, and AZ. Thus, in this example of use, the molded product can be inspected by capturing the molded product without substantially stopping movement of the approach frame while the molded product is being moved to the releasing position after having been taken out.

Figure 24A:
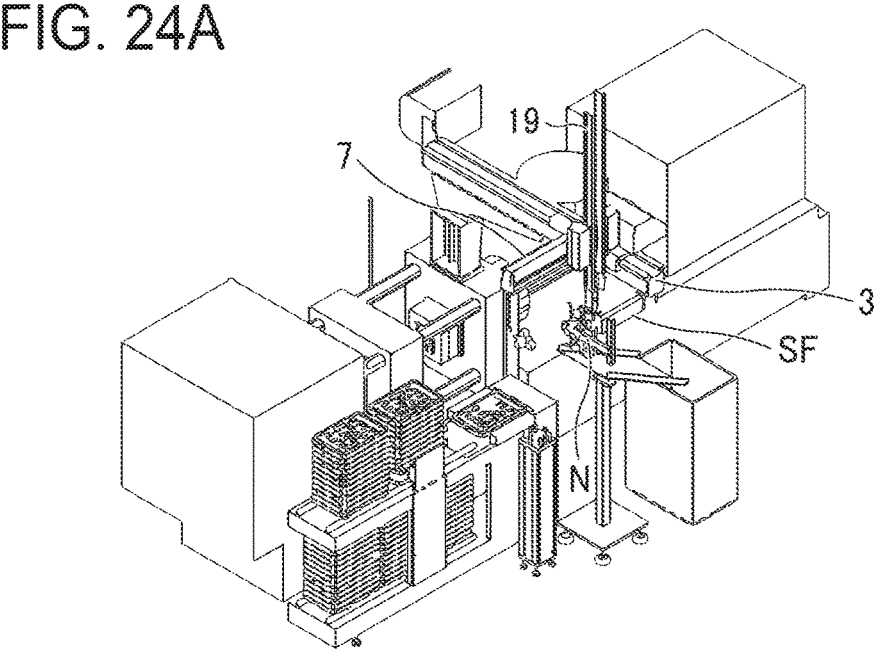
FIGS. 24A to 24C are a schematic perspective view illustrating an example use in which a molded product M taken out by the pickup head of the attachment mounted at the leading end of the approach frame is cut off using an external nipper, and enlarged perspective views of an essential portion as seen from different directions, respectively.
Figure 24B:
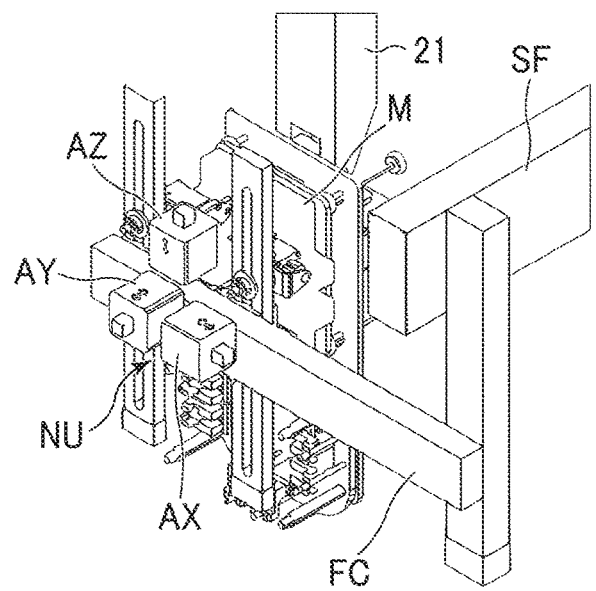
Figure 24C:
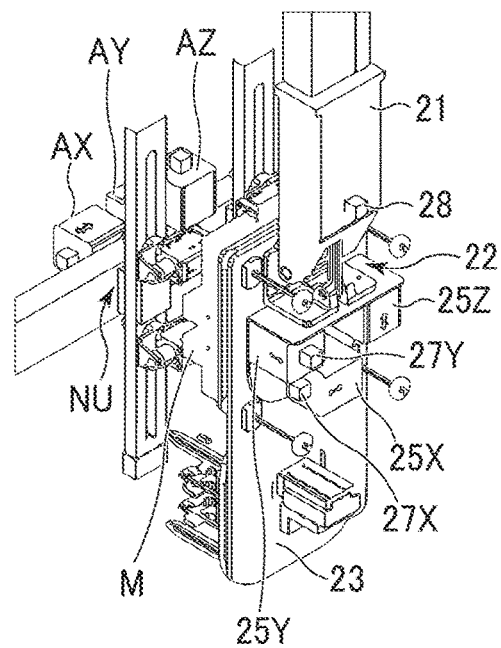

FIGS. 24A to 24C are a schematic perspective view illustrating an example of use in which the molded product M taken out by the pickup head 23 of the attachment 24 mounted at the leading end of the approach frame is cut off using an external nipper, and enlarged perspective views of an essential portion as seen from different directions, respectively. In this example, an external nipper unit NU is mounted at the leading end of the lateral frame 3 via a support frame SF. The external nipper unit NU includes three actuators AY, AX, and AZ mounted on a frame structure FC to which a nipper is attached. The vibration of the frame structure FC as caused in three directions of the frame is suppressed by the active control using the three actuators AY, AX, and AZ. Thus, according to this example of use, the cutting work can be performed with both vibration of the molded product and vibration of the external nipper unit NU being suppressed when the molded product M is cut off by the nipper of the external nipper unit NU at the releasing position after having been taken out. Thus, it is possible to reduce the cutting work time compared to the related art.

Seventh Embodiment

Figure 25A:
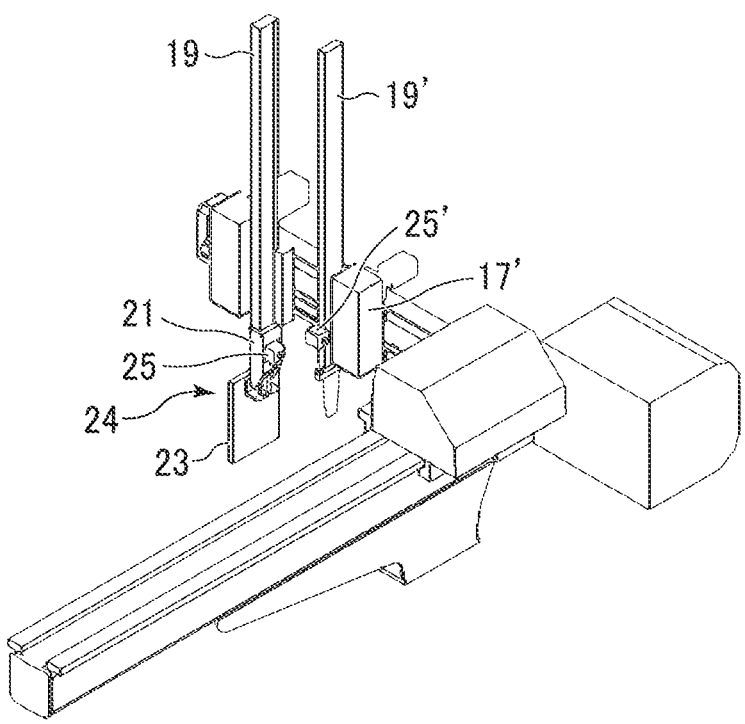
FIGS. 25A and 25B are a schematic perspective view of a seventh embodiment of the present invention and a perspective view of an essential portion around an attachment, respectively.
Figure 25B:
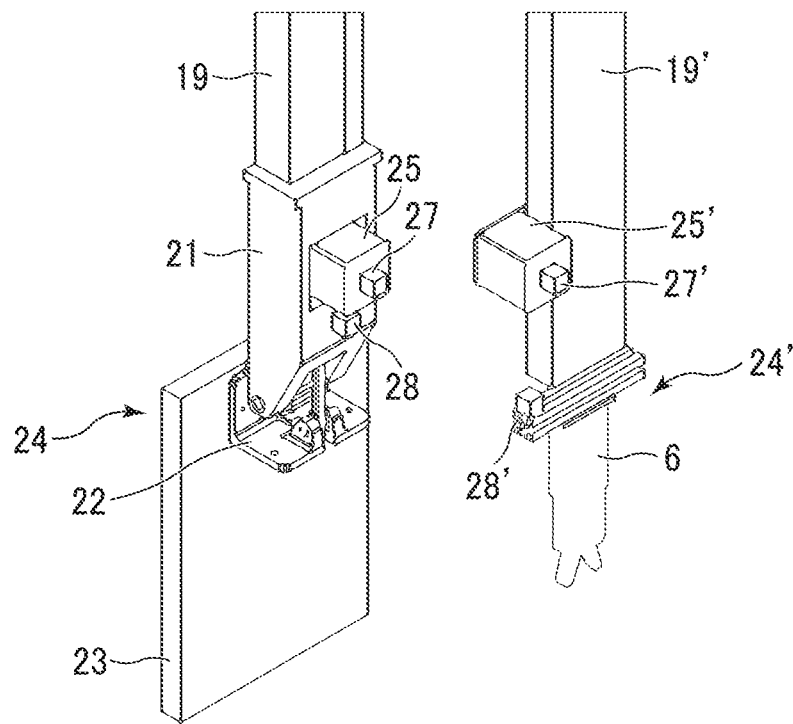

FIGS. 25A and 25B are a schematic perspective view of a seventh embodiment of the present invention and a perspective view of an essential portion around an attachment 24', respectively. In the embodiment, an electromagnetic actuator 25' is mounted on another support frame 19' including a chuck 6 for holding a waste part of a molded product taken out using the approach frame 19 which is used to take out the molded product from the molding die. According to the embodiment, the vibration of the chuck can be suppressed early, thereby facilitating the work using the chuck.

Eighth Embodiment

Figure 26A:
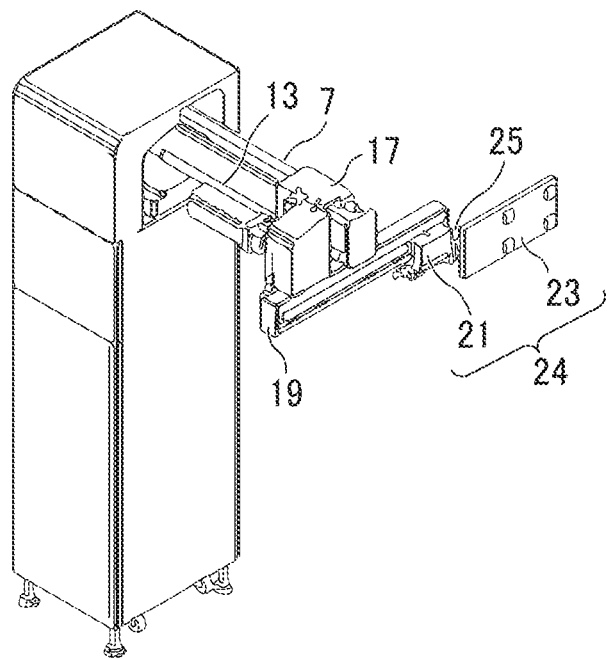
FIGS. 26A and 26B are schematic perspective views of an eighth embodiment of the present invention as seen from different directions, respectively.
Figure 26B:
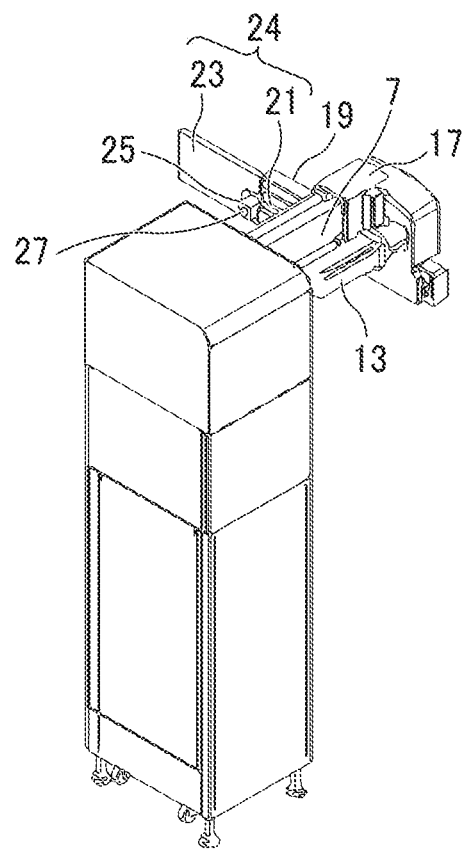
Figure 27A:
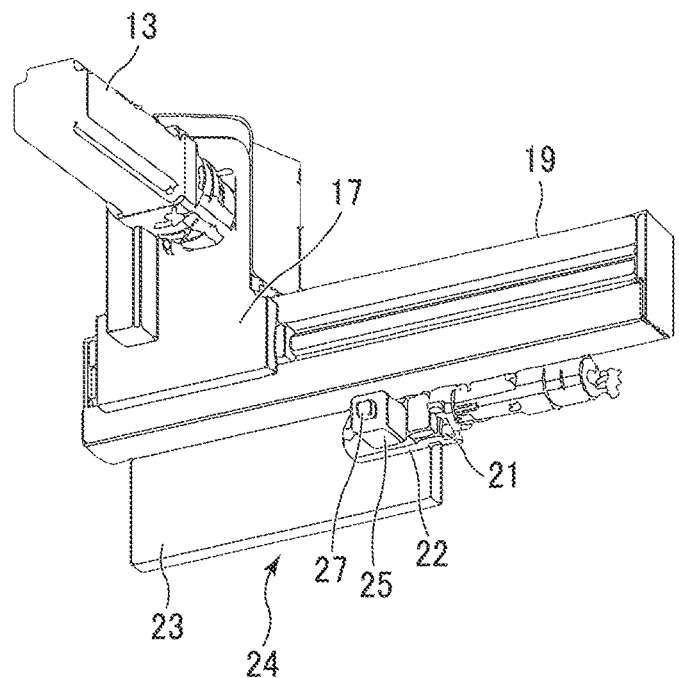
FIGS. 27A and 27B are enlarged perspective views of an essential portion of the eighth embodiment of the present invention, respectively.
Figure 27B:
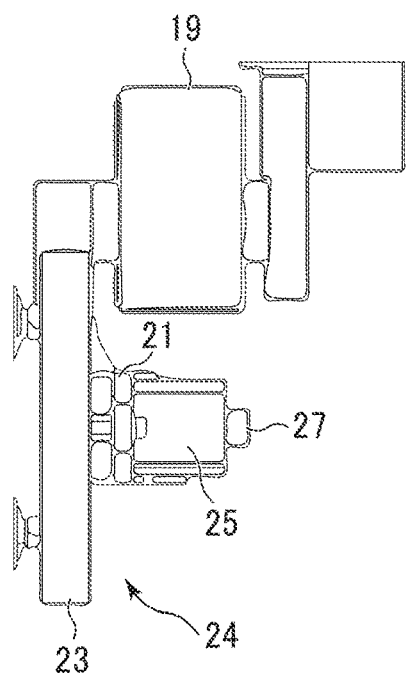

FIGS. 26A and 26B are schematic perspective views of an eighth embodiment of the present invention as seen from different directions. FIGS. 27A and 27B are enlarged perspective views of an essential portion of the eighth embodiment. In FIGS. 26A, 26B, 27A, and 27B, constituent parts that are the same as those of the apparatus for taking out a molded product according to the first embodiment illustrated in FIG. 1 are denoted by the same reference numerals as those used in FIG. 1. In the embodiment, the apparatus for taking out a molded product is of a so-called side entry type in which the approach frame 19 is moved in the horizontal direction to advance the attachment 24 into a molding die (not illustrated). The eighth embodiment differs from the first embodiment in that no lateral frame is provided and the approach frame 19 is movably supported by the travelling body 17 movably mounted on the extraction frame 7 and the approach frame 19 is movable in the horizontal direction (Y direction). Also in the embodiment, the electromagnetic actuator 25 is mounted on the pickup head fixture 22 included in the reverse unit 21 of the attachment 24. As in the first embodiment, the displacement vibration detecting section, which is operable to output a displacement vibration detection signal including information on a displacement vibration frequency component proportional to the displacement vibration of the attachment 24, detects, as the displacement vibration detection signal, a motor current signal of the servomotor 13 used in the servomechanism operable to move the approach frame 19 in the horizontal direction (Y direction), or a torque signal of the motor, or a signal proportional to the motor current signal or the torque signal. The displacement vibration of the pickup head 23 can be suppressed by causing the electromagnetic actuator 25 to operate to perform active control also when the approach frame 19 is advanced in the horizontal direction (lateral direction) into the molding die as in the present embodiment.

MODIFICATION

In the sixth embodiment described above, three electromagnetic actuators are mounted to suppress vibration as caused in the X, Y, and Z directions. In the present invention, however, it is not an essential requirement to apply the active control to suppression of vibrations as caused in three directions as long as the active control is adopted to suppress the vibration as caused in a certain direction that affects deformation of the molded product most.

INDUSTRIAL APPLICABILITY

According to the present invention, it is possible to provide an apparatus for taking out a molded product, the apparatus being capable of suppressing a displacement vibration of an attachment mounted at a leading end of each of the one or more approach frames by active control using one or more electromagnetic actuators.

What is claimed is:

1. An apparatus for taking out a molded product, comprising:
    a positioning servomechanism using a motor;
    one or more approach frames controlled by the positioning servomechanism and each having an attachment mounted at a leading end thereof; and
    an active vibration suppressing system including one or more actuators and configured to perform active control to suppress a displacement vibration of the attachment mounted on each of the one or more approach frames by causing the one or more actuators to apply to the attachment a vibration having an antiphase to the displacement vibration of the attachment, wherein:
    the one or more actuators are one or more electromagnetic actuators; and
    the one or more electromagnetic actuators are mounted to the attachment mounted on each of the one or more approach frames or each of the one or more approach frames such that the one or more electromagnetic actuators do not collide with one or more molding dies of a molding machine, wherein:
    the active vibration suppressing system further comprises:
        a displacement vibration detecting section operable to output a displacement vibration detection signal proportional to a displacement vibration of the attachment and capable of outputting the displacement vibration detection signal without using a sensor to be inserted into the molding die;
        an additional vibration detecting section operable to output an additional vibration detection signal proportional to an additional vibration generated by the one or more electromagnetic actuators; and
        a drive signal generating section operable to generate a drive signal required for active control of the one or more electromagnetic actuators so as to suppress the displacement vibration of the attachment mounted on each of the one or more approach frames, based on the displacement vibration detection signal and the additional vibration detection signal.

2. The apparatus for taking out a molded product according to claim 1, wherein
    the one or more approach frames include a first approach frame having an attachment mounted at a leading end thereof and configured to pick up a molded product from the molding die or to be attached with an insert component to be inserted into the molding die, and a second approach frame having an attachment mounted at a leading end thereof and configured to remove a waste part from the molded product picked up from the molding die by the first approach frame.

3. The apparatus for taking out a molded product according to claim 1, wherein
    defining that a Z direction denotes a direction in which one of the one or more approach frames moves into the molding die, a Y direction denotes a direction orthogonal to the Z direction, in which the attachment mounted on the one of the one or more approach frames approaches to or retracts from the molded product within the molding die, and an X direction denotes a direction orthogonal to the Y and Z directions, the one or more electromagnetic actuators include a first electromagnetic actuator operable to suppress at least the displacement vibration of the attachment as caused in the Y direction.

4. The apparatus for taking out a molded product according to claim 1, wherein
    defining that a Z direction denotes a direction in which one of the one or more approach frames moves into the molding die, a Y direction denotes a direction orthogonal to the Z direction, in which the attachment mounted on the one of the one or more approach frames approaches to or retracts from the molded product within the molding die, and an X direction denotes a direction orthogonal to the Y and Z directions, the one or more electromagnetic actuators include a first electromagnetic actuator operable to suppress the displacement vibration of the attachment as caused in the Y direction and a second electromagnetic actuator operable to suppress the displacement vibration of the attachment as caused in the X direction.

5. The apparatus for taking out a molded product according to claim 1, wherein defining that a Z direction denotes a direction in which one of the one or more approach frames moves into the molding die, a Y direction denotes a direction orthogonal to the Z direction, in which the attachment mounted on the one of the one or more approach frames approaches to or retracts from the molded product within the molding die, and an X direction denotes a direction orthogonal to the Y and Z directions, the one or more electromagnetic actuators include a first electromagnetic actuator operable to suppress the displacement vibration of the attachment as caused in the Y direction, a second electromagnetic actuator operable to suppress the displacement vibration of the attachment as caused in the X direction, and a third electromagnetic actuator operable to suppress the displacement vibration of the attachment as caused in the Z direction.

6. The apparatus for taking out a molded product according to claim 1, wherein:

the attachment mounted on one of the one or more approach frames includes a posture controller provided with a pickup head; and the one or more electromagnetic actuators are mounted on the posture controller.

7. The apparatus for taking out a molded product according to claim 1, wherein:

the attachment mounted on one of the one or more approach frames includes a posture controller provided with a pickup head; and the one or more electromagnetic actuators are mounted on the pickup head.

8. The apparatus for taking out a molded product according to claim 6, wherein the posture controller includes a housing and a container portion disposed inside the housing to receive the one or more electromagnetic actuators.

9. The apparatus for taking out a molded product according to claim 8, wherein the one or more electromagnetic actuators are mounted relative to the housing such that the one or more electromagnetic actuators are positioned outside a surface of the housing of the posture controller when the molded product is picked up from the molding die.

10. The apparatus for taking out a molded product according to claim 1, wherein one electromagnetic actuator is mounted onto an outer periphery of the leading end of each of the one or more approach frames so as to be positioned in proximity to the attachment.

11. The apparatus for taking out a molded product according to claim 1, wherein:

the attachment mounted on one of the one or more approach frames is constituted from a posture controller having a pickup head mounted thereon;

a pickup head fixture is attached to an outer side of a housing of the posture controller so as to be rotatable between a first position and a second position; and the pickup head extends along the approach frame and the one or more electromagnetic actuators are positioned below the posture controller when the pickup head fixture is situated in the first position, and the pickup head extends in a direction orthogonal to an extending direction of the approach frame and the one or more electromagnetic actuators are positioned on the side of the posture controller when the pickup head fixture is situated in the second position.

12. The apparatus for taking out a molded product according to claim 1, wherein:

the active vibration suppressing system performs active control for a period from the time before one of the one or more approach frames uses the attachment to pick up the molded product from the molding die or to place an insert component in the molding die until the molded product is released in a releasing position.

13. The apparatus for taking out a molded product according to claim 1, wherein:

the motor for the positioning servomechanism operable to move the one or more approach frames is constituted from an AC servomotor; and a transport mechanism of belt-type, rope-type, or carriage-type is provided between the AC servomotor and each approach frame.

14. The apparatus for taking out a molded product according to claim 1, wherein:

the displacement vibration detecting section is configured to output, as the displacement vibration detection signal, a motor current signal of the motor used in the positioning servomechanism operable to move the one or more approach frames, or a torque signal of the motor, or a signal proportional to the motor current signal or the torque signal.

15. The apparatus for taking out a molded product according to claim 1, wherein:

the displacement vibration detecting section is configured to output, as the displacement vibration detection signal, a displacement feedback signal of the motor used in the positioning servomechanism operable to move the one or more approach frames, or a signal proportional to the displacement feedback signal.

16. The apparatus for taking out a molded product according to claim 1, wherein:

the additional vibration detecting section is configured to output the additional vibration detection signal without using a sensor.

17. The apparatus for taking out a molded product according to claim 16, wherein:

the additional vibration detecting section is constituted from a coil operable to detect a counter electromotive force caused when an electric power proportional to the drive signal is supplied to the one or more electromagnetic actuators and to output a signal proportional to the detected counter electromotive force as the additional vibration detection signal.

18. The apparatus for taking out a molded product according to claim 1, wherein:

the additional vibration detecting section is constituted from an acceleration sensor attached to a mover of each of the one or more electromagnetic actuators and operable to detect an acceleration of the mover.

19. The apparatus for taking out a molded product according to claim 1, wherein:

the active vibration suppressing system further comprises a phase shift correcting section operable to correct a phase shift of the displacement vibration detection signal outputted from the displacement vibration detecting section, based on predetermined phase shift information, and to generate a corrected displacement vibration detection signal; and the drive signal generating section is configured to generate the drive signal so as to suppress the displacement vibration of the one or more electromagnetic actuators, based on a displacement vibration frequency component included in the corrected displacement vibration detection signal and having a phase shift corrected and an additional vibration frequency component included in the additional vibration detection signal.

20. The apparatus for taking out a molded product according to claim 19, wherein:

the drive signal generating section is configured to adjust a gain of the corrected displacement vibration detection signal and a gain of the additional vibration detection signal, and then to perform computation to reduce or remove an effect due to the additional vibration frequency component generated by the additional vibration of the one or more electromagnetic actuators and included in the displacement vibration frequency component.

21. The apparatus for taking out a molded product according to claim 20, wherein:

the additional vibration frequency component is a frequency component of a velocity of the additional vibration.

* * * * *